US010837912B2

(12) United States Patent
Reed et al.

(10) Patent No.: US 10,837,912 B2
(45) Date of Patent: Nov. 17, 2020

(54) SYSTEMS AND METHODS FOR CONTROL OF POLYMER REACTIONS AND PROCESSING USING AUTOMATIC CONTINUOUS ONLINE MONITORING

(71) Applicants: ADVANCED POLYMER MONITORING TECHNOLOGIES, INC., New Orleans, LA (US); THE ADMINISTRATORS OF THE TULANE EDUCATIONAL FUND, New Orleans, LA (US)

(72) Inventors: Wayne Frederick Reed, New Orleans, LA (US); Michael Felix Drenski, New Orleans, LA (US)

(73) Assignees: ADVANCED POLYMER MONITORING TECHNOLOGIES, INC., New Orleans, LA (US); THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 670 days.

(21) Appl. No.: 15/515,119

(22) PCT Filed: Sep. 30, 2015

(86) PCT No.: PCT/US2015/053093
§ 371 (c)(1),
(2) Date: Mar. 28, 2017

(87) PCT Pub. No.: WO2016/054138
PCT Pub. Date: Apr. 7, 2016

(65) Prior Publication Data
US 2017/0212054 A1 Jul. 27, 2017

Related U.S. Application Data

(60) Provisional application No. 62/058,545, filed on Oct. 1, 2014.

(51) Int. Cl.
*G01N 21/75* (2006.01)
*G01N 15/06* (2006.01)
(Continued)

(52) U.S. Cl.
CPC ............ *G01N 21/75* (2013.01); *B01J 8/1809* (2013.01); *G01N 11/02* (2013.01); *G01N 15/06* (2013.01);
(Continued)

(58) Field of Classification Search
CPC ....... B01J 8/1809; G05B 13/04; G01N 15/06; G01N 2015/0693; G01N 11/02; G01N 21/75
See application file for complete search history.

(56) References Cited

U.S. PATENT DOCUMENTS

2004/0236039 A1  11/2004  Jachuck
2004/0254309 A1  12/2004  Parrish
(Continued)

FOREIGN PATENT DOCUMENTS

JP  2014-508294 A  4/2014

OTHER PUBLICATIONS

Extended European Search Report dated Jan. 26, 2018 in related EP Application No. 15847446.0, filed Apr. 25, 2017, Advanced Polymer Monitoring Technologies, Inc. et al., 9 pages.
(Continued)

*Primary Examiner* — Shogo Sasaki
(74) *Attorney, Agent, or Firm* — Polsinelli PC

(57) ABSTRACT

Manual and automatic methods and devices using a ACOMP system for active control of polymerization reaction processes. An ideal desired trajectory of one or more reaction and polymer characteristics can be established to produce a desired final polymer product with specified characteristics from a polymerization reaction process. A current reaction
(Continued)

trajectory of a polymerization reaction process can be driven to an ideal or desired reaction trajectory. In a manual embodiment an operator can use ACOMP data to adjust process variables in order to drive the current reaction trajectory toward the ideal or desired reaction trajectory. In an automated mode a control program can use ACOMP data to make adjustments to process variables to drive the polymerization reaction process toward the desired trajectory as closely as possible either empirically or by solving the governing equations for the polymerization reaction process.

21 Claims, 13 Drawing Sheets

(51) Int. Cl.
    *B01J 8/18*     (2006.01)
    *G01N 11/02*     (2006.01)
    *G05B 13/04*     (2006.01)

(52) U.S. Cl.
    CPC ..... *G05B 13/04* (2013.01); *G01N 2015/0693* (2013.01)

(56) References Cited

U.S. PATENT DOCUMENTS

| | | |
|---|---|---|
| 2005/0267267 A1 | 12/2005 | Sandell et al. |
| 2008/0216563 A1 | 9/2008 | Reed et al. |
| 2009/0234081 A1 | 9/2009 | Thomas, Jr. |
| 2009/0306311 A1 | 12/2009 | Reed |
| 2014/0080115 A1 | 3/2014 | Reed |

OTHER PUBLICATIONS

PCT Search Report and Written Opinion dated Feb. 4, 2016 in corresponding PCT Application No. PCT/US2015/053093, filed Sep. 30, 2015 to Advanced Polymer Monitoring Technologies, Inc. et al., 11 pages.

SYSTEMS AND METHODS FOR CONTROL OF POLYMER REACTIONS AND PROCESSING USING AUTOMATIC CONTINUOUS ONLINE MONITORING

CROSS-REFERENCE TO RELATED APPLICATION

This Application claims the benefit of U.S. Provisional Application No. 62/058,545, filed Oct. 1, 2014, the contents of which, including any references cited therein, are incorporated by reference herein.

GOVERNMENT LICENSE RIGHTS

This invention was made with government support under Contract No. DE-EE0005776, awarded by the U.S. Department of Energy. The government has certain rights in the invention.

FIELD OF TECHNOLOGY

The subject matter of the present application is directed to systems and methods for monitoring and controlling polymerization reactions.

BACKGROUND

There is a large body of literature and a vast field of practice for controlling chemical reactions and processes involving small molecules, such as raw petroleum materials (e.g. olefins, alkanes, cyclic compounds, waxes, etc.), pharmaceutical agents, salts, and other similar small molecules. In the area of polymers, the goal of reaction and process control has been more difficult to achieve because polymer properties are inherently challenging to measure, even offline. For example, reaction and processing media involved in polymerization reactions are often viscous, turbid, inhomogeneous, or combinations thereof. Additionally, polymer populations produced can have wide variations of properties, such as varying molecular weight distributions, amount and degree of branching and cross-linking, co-monomeric composition, conformations, and other characteristics. There is nonetheless abundant work in the field, both theoretical (such as z-transform methods and method of moments) and experimental, but none of the work has had the availability of continuous online measurements of polymer reaction and process properties, in terms of polymer molecular weight, intrinsic viscosity, co-monomer composition drift, and other properties. For examples of theoretical work regarding z-transform methods and method of moments, see "Monitoring Polymerization Reactions, From Fundamentals to Applications," Eds. Reed, W. F., and Alb, A. M., Wiley, 2014, Chapters 16-18; and "Polymerization Process Modelling," Dotson et al., VCH Pub., New York, 1996.

Extensive work on measuring, controlling and engineering more robust reactors for polymerization processes, is summarized by Richards and Congalidis in "Measurement and control of polymerization reactors." *Comp. Chem. Eng.,* Vol. 30(10-12), pp. 1447-1463, 2006. They report that much attention has been focused on maintaining pressure, temperature, level and flow (PTLF) in the polymerization reactor (for example, see Handbook of polymer reaction engineering, Eds. Meyer, T. and Keurentjes, J., Wiley-VCH, Weinheim, Germany, pp. 595-678, 2005; and Instrument engineer's handbook, $4^{th}$ edition: Process measurement and analysis, Liptak, B. G., CRC Press, New York, 2003.). Online composition measurement techniques, such as Infrared, Fourier transform infrared (FTIR), near infra-red (NIR) Raman spectroscopy, calorimetry, and gas chromatography are available. For examples of Infra-red spectroscopy, calorimetry and gas chromatography, see "Recent developments in hardware sensors for the online monitoring of polymerization reactions" Kammona, O. et al., *Journal of Macromolecular Science-Reviews in Macromolecular Chemistry,* Vol. C39(1), pp. 57-134, 1999. For examples of FTIR and NIR spectroscopy, see "Continuous solution polymerization reactor control. 2. Estimation and nonlinear reference control during methyl methacrylate polymerization" Adebekun D. and Schorl F. J., *Ind. Eng. Chem. Res.,* Vol. 28(12), pp. 1846-1861, 1989. For examples of Raman spectroscopy, see Principles of polymer systems ($5^{th}$ ed), Rodriguez, F. et al., Taylor and Francis, New York, 2003.

Work has been reported on controlling polymer composition during copolymerization reactions. For example, the Kalman filter method is based on a linear approximation of the nonlinear process (for example, see "Applications of nonlinear observers and control: improving productivity and control of free radical solution copolymerization" Hammouri, H. et al., *Ind. Eng. Chem. Res.,* Vol. 38(12), pp. 4815-4824, 1999) but has problems with stability and convergence (for example see "On-line estimation of microbial specific growth rates: an illustrative case study" Dochain, D. and Pauss, A., *Can. J. Chem. Eng.,* Vol. 66(4), pp. 626-631, 1988; "Online molecular weight distribution estimation and control in batch polymerization" Ellis, M. F. et al., *AIChE J.,* Vol. 40(3), pp. 445-462, 1994; "State estimation for semi-batch polymerization reactors" Kozub, D. J. and MacGregor, J. F., *Chem. Eng. Sci.,* Vol. 47(5), pp. 1047-1062, 1992; "Online nonlinear model-based estimation and control of a polymer reactor" Mutha, R. K. et al., *AIChE J.,* Vol. 43(11), pp. 3042-3058, 1997; and "A new multirate-measurement-based estimator: emulsion copolymerization batch reactor case study" Mutha, R. K. et al., *Ind. Eng. Chem. Res.,* Vol. 36(4), pp. 1036-1047, 1997). For that reason, numerous nonlinear methods have been developed. Ellis et al. (see "Online molecular weight distribution estimation and control in batch polymerization" Ellis, M. F. et al., *AIChE J.,* Vol. 40(3), pp. 445-462, 1994) proposed an extended Kalman filter that has been used for control purposes (see "Online nonlinear model-based estimation and control of a polymer reactor" Mutha, R. K. et al., *AIChE J.,* Vol. 43(11), pp. 3042-3058, 1997; and "A new multirate-measurement-based estimator: emulsion copolymerization batch reactor case study" Mutha, R. K. et al., *Ind. Eng. Chem. Res.,* Vol. 36(4), pp. 1036-1047, 1997). Nonlinear state observers that use rate of heat generation due to chemical reaction were used by Hammouri et al. to obtain key parameters during free radical copolymerizations (see "Applications of nonlinear observers and control: improving productivity and control of free radical solution copolymerization" Hammouri, H. et al., *Ind. Eng. Chem. Res.,* Vol. 38(12), pp. 4815-4824, 1999). These estimations and techniques are simpler to tune than Kalman filters (for example, see "Non-linear tracking of glass transition temperatures for free radical emulsion copolymers" Fevotte, G. et al., *Chem. Eng. Sci.,* Vol. 53(4), pp. 773-786, 1998; and "Online monitoring and modeling of free radical copolymerizations: butyl acrylate/vinyl acetate" Othman, S. et al., *Polym. React. Eng.,* Vol. 7(1), pp. 1-42, 1999). Kravaris et al. used temperature tracking as a nonlinear method for controlling copolymer composition (see "Nonlinear controllers for trajectory tracking in batch processes" Kravaris, C. et al., Comp. Chem. Eng., Vol. 13(1-2), pp. 73-82, 1989). Model predictive control (MPC) and nonlinear MPC (NLMPC) algorithms have been suggested for control of nonlinear systems. For exemplary MPC algorithms, see "On-line multi-variable predictive control of molar mass and particle size distributions in free-radical emulsion copolymerization" Alhamad, B. et al., Chem. Eng. Sc., Vol. 60(23), pp. 6596-6606, 2005; and "Internal model control. A unifying review and some new results" Garcia, C. E., and Moran M., Ind. Eng. Chem. Process. Des. Dev., Vol. 21(2), pp. 308-323, 1982. For exemplary NLMPC algorithms, see "Control of copolymer properties in a semibatch methyl methacrylate/methyl acrylate copolymerization reactor by using a learning-based nonlinear model predictive controller" Park, M.-J., and Rhee, H.-K., Ind. Eng. Chem. Res., Vol. 43(11), pp. 2736-2746, 2004; Nonlinear quadratic dynamic matrix control with state estimation" Gattu, G., and Zafiriou, E., Ind. Eng. Chem. Res., 31(4):10961104, 1992; "Extended kalman filter based nonlinear model predictive control." Lee, J. H., and Ricker, N. L., Ind. Eng. Chem. Res., Vol. 33(6), pp. 1530-1541, 1994; and "Nonlinear model predictive control: current status and future directions" Henson, M. A., Comp. Chem. Eng., Vol. 23(2), pp.187-202, 1998.

The semi-batch approach, where policies are developed for selective reagent feeds to the reactor, has been extensively elaborated, especially for emulsion polymerization and in the context of controlling composition during copolymerization reactions (for example, see "Applications of nonlinear observers and control: improving productivity and control of free radical solution copolymerization" Hammouri, H. et al., Ind. Eng. Chem. Res., Vol. 38(12), pp. 4815-4824, 1999; "Extended kalman filter based nonlinear model predictive control." Lee, J. H., and Ricker, N. L., Ind. Eng. Chem. Res., Vol. 33(6), pp. 1530-1541, 1994; "A comprehensive experimental investigation of the methyl methacrylate/butyl acrylate/acrylic acid emulsion terpolymerization" Parouti, S. et al., Polym. Reac. Eng., Vol. 11(4), pp. 829-853, 2003; "Molecular weight distribution of poly(methyl methacrylate) produced in a starved feed reactor." Cao, G. P. et al., J. Polym. Eng., Vol. 21(5), pp. 401-419, 2001; "Grafting of styrene and methyl methacrylate concurrently onto polybutadiene in semicontinuous emulsion processes and determination of copolymer microstructure" Aerdts, A. M. et al., Polymer; 35(8):16481653, 1994; "Kinetic and molecular weight control for methyl methacrylate semi-batch polymerization. I. Modelling" Wu, J.-Y, and Shan G.-R., J. Appl. Pol. Sc., Vol. 100(4), pp. 2838-2846, 2006; "Design and application of model-on-demand predictive controller to a semibatch copolymerization reactor" Hur, S.-M. et al., Ind. Eng. Chem. Res., 2003; Vol. 42(4), pp. 847-859, 2003; and "Dynamic optimization of non-linear emulsion copolymerization systems. Open-loop control of composition and molecular weight distribution." Vicente, M. et al., Chem. Eng. J., Vol. 85(2-3), pp. 339-349, 2002). Model based semi-batch monomer feeding policies have been developed for controlled radical polymerization (CRP) (for example, see "Programmed synthesis of copolymer with controlled chain composition distribution via semibatch RAFT copolymerization" Sun, X. et al., Macromolecules, Vol. 40(4), pp. 849-859, 2007; and "Design and control of copolymer composition distribution in living radical polymerization using semi-batch feeding policies: A model simulation" Wang, R. et al., Macromol. Theory Simul., Vol. 15(4), pp. 356-368, 2006). They provided a reactor model with mass balance equations and showed experimental results of controlling the composition. Vicente et al. controlled composition and molecular weight distribution in emulsion copolymerization in an open-loop method by maintaining the ratio of co-monomers (see "Simultaneous control of copolymer composition and MWD in emulsion copolymerization" Vincente, M. et al., AIChE J., Vol. 47(7), pp. 1594-1606, 2001; and "Dynamic optimization of non-linear emulsion copolymerization systems. Open-loop control of composition and molecular weight distribution." Vicente, M. et al., Chem. Eng. J., Vol. 85(2-3), pp. 339-349, 2002). Yanjarappa et al. synthesized, via a semibatch method, copolymers with constant composition for biofunctionalization (see "Synthesis of copolymers containing an active ester of methacrylic acid by RAFT: controlled molecular weight scaffolds for biofunctionalization" Yanjarappa, J. M. et al., Biomacromolecules, Vol. 7(5), pp. 1665-1670, 2006). General semibatch policies are reviewed by Asua (see Polymer Reaction Engineering, Ed.: Asua, J. M., Blackwell Publishing Ltd., Oxford, pp. 1-28, 2007). There have been efforts to control molecular weight, such as those by Kiparissides and Morris (see "Intelligent manufacturing of polymers" Kiparissides, C., and Morris, J., Comp. Chem. Eng., Vol. 20, pp. 1113-1118, 1996), Othman et al. (see "Online monitoring and modeling of free radical copolymerizations: butyl acrylate/vinyl acetate" Othman, S. et al.; Polym. React. Eng.; Vol. 7(1); pp. 1-42; 1999), and Wu and Shan (see "Kinetic and molecular weight control for methyl methacrylate semi-batch polymerization. I. Modelling" Wu, J.-Y, and Shan G.-R., J. Appl. Pol. Sc., Vol. 100(4), pp. 2838-2846, 2006). It is frequently reported that the main difficulty in controlling the molecular weight is the lack of on-line sensors.

In general the best way to control molecular weight is by manipulating the concentration of monomer, initiator, or chain transfer agent (for example, see "Online monitoring and modeling of free radical copolymerizations: butyl acrylate/vinyl acetate" Othman, S. et al.; Polym. React. Eng.; Vol. 7(1); pp. 1-42; 1999; "Dynamic modeling and state estimation for an emulsion copolymerization reactor" Dimitratos, J. et al., Comp. Chem. Eng., Vol. 13(1-2), pp. 21-33, 1989; "Feedforward and feedback control of a solution copolymerization reactor" Congalidis, J.P. et al., AIChE J., Vol. 35(6), pp. 891-907, 1989; "Molecular weight distributions in free-radical polymerizations. 1. Model development and implications for data interpretation" Clay, P. A., and Gilbert, R. G., Macromolecules, Vol. 28(2), pp. 552-569, 1995; "Molecular weight distribution in emulsion polymerization: role of active chain compartmentalization" Ghielmi, A. et al., Macromolecules, Vol. 31(21), pp. 7172-7186, 1998; "Control of polymer molecular weight using near infrared spectroscopy" Othman, N. S. et al., AIChE J., Vol. 50(3), pp. 654-664, 2004 ; and "Continuous solution polymerization reactor control. 2. Estimation and nonlinear reference control during methyl methacrylate polymerization" Adebekun, D., and Schorl, F. J., Ind. Eng. Chem. Res., Vol. 28(12), pp. 1846-1861, 1989). Modi and Guillet described a photochemical method using a 1,3-(di-1-naphtyl)propan-2-one (DNP) compound (see "Photochemical control of molecular weight during free-radical polymerization" Modi, P. J., and Guillet, J. E., Macromolecules, Vol. 27(12), pp. 3319-3321, 1994). In the presence of DNP, when exposed to light, growing polymer chains during a free radical polymerization reaction are terminated, hence providing a means to control molecular weight, even if not particularly effective.

Molecular weight has often been controlled by temperature (for example, see "Nonlinear adaptive temperature control of multi-product, semi-batch polymerization reactors" Clarke-Pringle, T., and MacGregor, J. F., Comp. Chem. Eng., Vol. 21(12), pp. 1395-1409, 1997). Many problems with this approach have been reported (for example, see "Measurement and control of polymerization reactors" Richards, J.R., and Congalidis, J.P.; Comp. Chem. Eng.; Vol. 30(10-12); pp. 1447-1463; 2006; "Applications of nonlinear observers and control: improving productivity and control of free radical solution copolymerization" Hammouri, H. et al.; Ind. Eng. Chem. Res.; Vol. 38(12); pp. 4815-4824; 1999; "Non-linear tracking of glass transition temperatures for free radical emulsion copolymers" Fevotte, G. et al.; Chem. Eng. Sci.; Vol. 53(4); pp. 773-786; 1998; "Online monitoring and modeling of free radical copolymerizations: butyl acrylate/vinyl acetate" Othman, S. et al.; Polym. React. Eng.; Vol. 7(1); pp. 1-42; 1999; and On-line multi-variable predictive control of molar mass and particle size distributions in free-radical emulsion copolymerization" Alhamad, B. et al.; Chem. Eng. Sc.; Vol. 60(23); pp. 6596-6606; 2005).

Again, due to problems with on-line measurements, Vicente at al. controlled composition and MWD in emulsion copolymerizations by an open-loop semi-batch method (see "Simultaneous control of copolymer composition and MWD in emulsion copolymerization" Vincente, M. et al., AIChE J., Vol. 47(7), pp. 1594-1606, 2001). In Vicente at al., optimal feed profiles were determined using iterative dynamic programming. The success of this method depends on the accuracy of mathematical models and requires that there be no unmodeled disturbances during the process. Vicente et al. estimated conversion from calorimetric data. Off-line measurements after the reaction agreed with the estimations and confirmed that the mathematical model was good. The authors admitted, however, that more robust closed loop methods involving on-line measurements would have to be developed for better control.

Othman et al. proposed a closed-loop method to control molecular weight (see "Online monitoring and modeling of free radical copolymerizations: butyl acrylate/vinyl acetate" Othman, S. et al.; Polym. React. Eng.; Vol. 7(1); pp. 1-42; 1999). Here, NIR was used to estimate conversion. A nonlinear estimator was developed to get the reaction rate necessary for the control loop. This method relies on the quality of offline measurements necessary for NIR calibration. Non-linear high gain observers were used to identify model parameters and the reaction rates which were used to obtain desired monomer feeds to keep weight average molecular weight ($M_w$) constant. This feedback control produced high molecular masses which could not be achieved in open-loop cases but the approach still relied on the quality of the model.

Park and Rhee used a learning-based nonlinear model predictive control (NLMPC) to control semibatch copolymerization (see "Control of copolymer properties in a semibatch methyl methacrylate/methyl acrylate copolymerization reactor by using a learning-based nonlinear model predictive controller" Park, M.-J., and Rhee, H.-K.; Ind. Eng. Chem. Res.; Vol. 43(11); pp. 2736-2746; 2004). The purpose was to linearize a nonlinear model based on previous batch data. In this way, the prediction is a function of the increment of inputs between two consecutive batches. An online densitometer was used to obtain conversion and a viscometer to calculate molecular weight. These measured properties were the fed back and, by using estimation and optimization procedures, the necessary feeds were obtained. Simulations were successful and were experimentally verified for a methacrylate/methyl acrylate copolymerization. The system did not exhibit any disturbances for any reaction. As the authors report, in general, disturbance models would have to be used for successful control.

DETAILED DESCRIPTION

Figure 1:
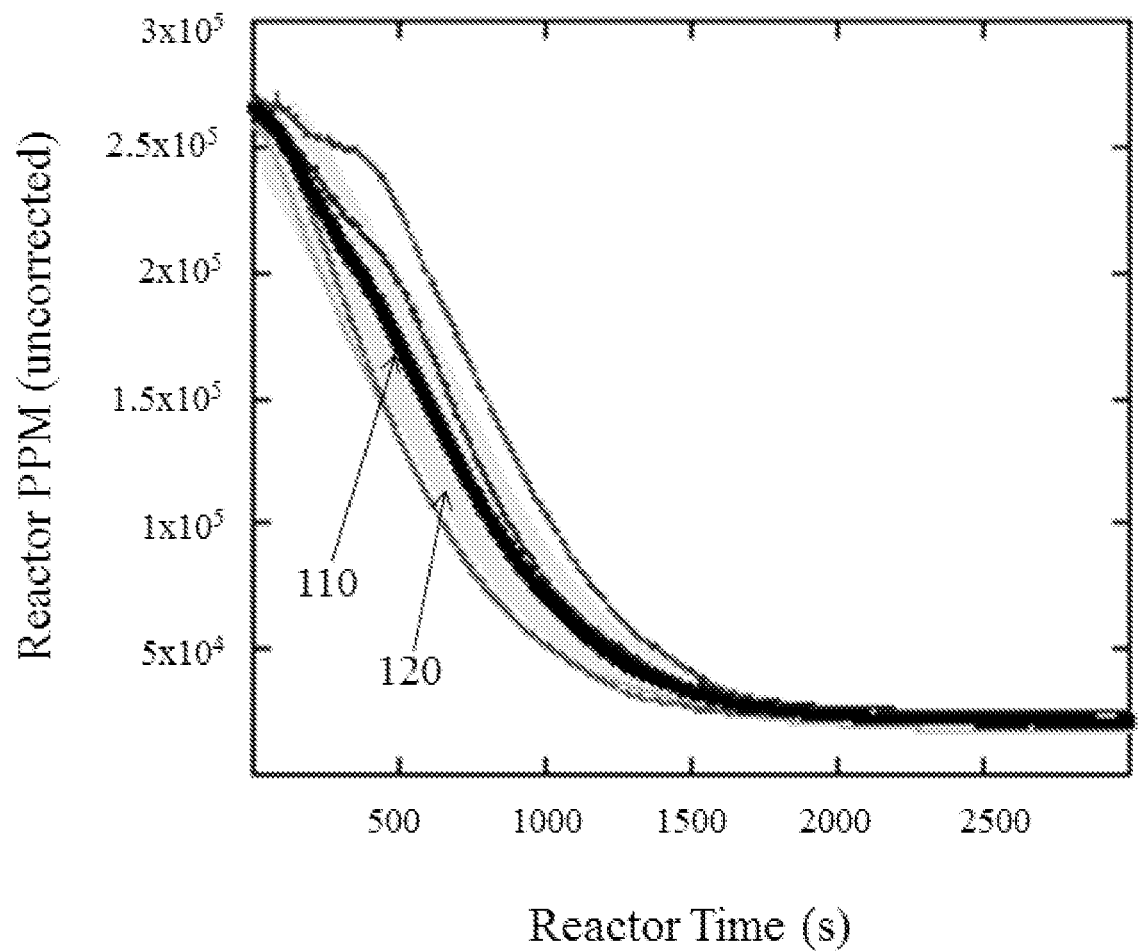
FIG. 1 is a diagram of exemplary of reaction trajectories of free radical polymerization reactions characterized in terms of conversion of monomer in association with certain embodiments of the present disclosure.

Systems and methods for automatic continuous online monitoring of polymerization reactions (ACOMP) have been developed over the past 17 years to monitor polymer reactions and processes in near realtime. A very wide range of polymerization reactions, reactors, and processes have been successfully monitored with ACOMP methods and systems. A list of such successful monitoring scenarios, to all of which the subject matter of the present disclosure can be applied, include, but are not limited to: free radical homo- and copolymerization, controlled free radical reactions such as, but not limited to, Ring Opening Metathesis Polymerization (ROMP), Atom Transfer Radical Polymerization (ATRP), Nitroxide Mediated Polymerization (NMP), Reversible Addition Fragmentation Transfer polymerization (RAFT), living type reactions, polycondensation and other step growth reactions, reactions involving two or more co-monomers, branching and crosslinking reactions, post-polymerization polymer modifications and functionalization such as hydrolysis, oxidation, sulfonation, etc., natural product derivitization and waste water monitoring, reactions in bulk, solvent, and heterogeneous phases such as, but not limited to, emulsions, miniemulsions, inverse emulsions, micelles, and dispersions, high viscosity and high temperature reactions, pressurized reactions, and others. Examples of the types of polymers to which the ACOMP system and the presently disclosed subject matter can be applied include, but are not limited to the following chemistries and derivatives: polyacrylamides, poly(vinyl pyrrolidones), polyacrylates, methacrylates, ethacrylates, etc., poly(styrenes), polycarbonates, poly(vinyl alcohols), urethanes, polyimides, polyamides, polyurethanes, polyolefins (homo- and copolymers of polyethylene, polypropylene, polybutadiene, etc), polysulfones, polyesters, polyamines, polyvinyl chlorides, natural products such as guar, xanthan, gum Arabic, alginates, schizophyllans, and proteins including enzymatic enzymes and structural proteins such as collagen, actin, and myosin.

An especially important area of application for the presently disclosed subject matter is in the growing field of stimuli responsive polymers, also termed 'smart polymers'. Smart polymers are polymers that can respond to stimuli such as heat, light and other radiation, pressure, and solution conditions such as pH, ionic strength, presence of specific ions and other molecules, colloids or polymers. Exemplary responses to stimuli can be, but are not limited to, micellization, emulsification, phase changes, conformational changes, self-healing, transitions from conductor to semiconductor, and other similar responses to stimuli. Smart polymers can be used to trap and release drugs in a targeted fashion, for other uses in medicine and nanomedicine, for making stimuli responsive coatings for glass, optics, electronics, optoelectronic, marine uses, for entrapping oil, or other any other suitable use envisioned by one of ordinary skill in the art. Types of smart polymers and oligomers being developed include, but are not limited to, dendrimers, star polymers, highly reticulated and hyper-branched polymers, cavitands, non-covalently bound polymers, copolymers, and block copolymers, polymers, copolymers, or block copolymers grafted to nanoparticles, polymers copolymers, and block copolymers conjugated to biological polymers or nanocomposites, etc. The polymerization processes associated with such stimuli responsive polymers and oligomers are often very complex compared to more conventional polymers. The currently disclosed subject matter can be used to actively control the synthetic processes of stimuli responsive polymers, to enable the scaling up of polymerization reactions to an industrial scale. It is envisioned that many of the new materials in the 21$^{st}$ century and beyond will make use of stimuli responsive polymers, and that these will gain a growing share of the vast global polymer manufacturing industry.

The first steps toward reaction control using an ACOMP method and system were published recently by Kreft and Reed in "Predictive control and verification of conversion kinetics and polymer molecular weight in semi-batch free radical homopolymer reactions" *European Polymer J.*, Vol. 45, pp. 2288-2303, 2009, and "Predictive control of average composition and molecular weight distributions in semi-batch free radical copolymerization reactions", *Macromolecules*, Vol. 42, pp. 5558-5565, 2009, the contents of which are incorporated herein by reference. First, kinetic parameters of polymer reactions, such as batch reaction rates and co-monomer reactivity ratios, were determined using the ACOMP method and system. Then, governing kinetic equations were solved to predict the reaction trajectories that would occur when specific reagent feeds were made to the reactor. The process of adding reagents to a reaction continuously, or substantially continuously, is often termed 'semi-batch' or 'semi-continuous' operation. In the work by Kreft and Reed, it was first demonstrated that different flow rates and flow periods of initiator into the reactor could produce predictable trajectories for reaction rates. The details of changes in process variables such as these, temperature, and others are usually termed 'policies' in the field of reactor engineering, For example, for free radical polymerization, it was theoretically and experimentally demonstrated that a continuous flow of initiator into the reactor, whose flow rate increases linearly in time, causes a Gaussian conversion curve of the form as follows:

$$[m](t) = [m]_0 e^{-\frac{k_P}{2}\sqrt{\frac{Fk_d}{k_t}\frac{\sigma[I']}{V_0}}t^2} \tag{1}$$

where [m](t) is the concentration of monomer left in the reactor at any time t after the reaction begins, $k_p$ is the chain propagation rate constant, F is the initiator decomposition efficiency, $k_t$ is the radical-radical termination rate constant, $k_d$ is the initiator thermal decomposition rate constant, [I] is the concentration of initiator in the feed reservoir which is pumped into the reactor at a rate σ (cm$^3$/s), $[m]_0$ is the initial monomer concentration in the reactor and $V_o$ is the initial volume of fluid in the reactor.

The predictive method of Kreft and Reed is passive; a presumed trajectory is computed but no active control or intervention is made during the reaction to maintain the desired trajectory. To control molecular weight passively, Kreft and Reed used a flow rate of monomer into the reactor that balanced the reaction rate of monomer conversion into polymer which predicted a constant $M_w$ throughout the reaction. The kinetic chain length of a free radical produced polymer is expressed as follows:

$$v = \frac{k_P[m]}{k_t[R] + k_3[G]} \tag{2}$$

where [R] is the free radical concentration and $k_3$ is a chain transfer constant when a chain transfer agent is present in concentration [G]. Kreft and Reed did not use a chain transfer agent, and used a very slowly composing initiator such that [R] was approximately constant, and hence keeping [m] constant by the proper flow rate of monomer into the reaction predicts a constant chain length.

Using equation 2, Kreft and Reed then created predicted molecular weight trajectories by controlling [m] in the reactor through appropriate monomer flow rates. For example, by increasing [m] over time, a so-called 'flooded' feed, the molecular weight will actually increase during the reaction. It is of note that when no monomer feed is used, i.e. in a batch reaction, [m] inevitably diminishes over time as monomer converts into polymer, so that molecular weight will normally decrease in a batch reaction when [R] is approximately constant or diminishes more slowly than [m], both which are common.

After this initial work, Kreft and Reed then went on to make predictive control of copolymer composition by using differential feed rates of two co-monomers (acrylamide and styrene sulfonate), which were computed according to the reactivity ratios of the co-monomers and their individual batch reaction rates. The effect of discrete addition of reagents on polymerization reaction process characteristics was also discussed, as opposed to continuous flow of reagents as discussed above.

While the above described uses of ACOMP methods for predictive control opened up new possibilities for passive reaction control, the use of such systems and methods for active feedback control of reactions has not been elaborated upon.

The purpose of the current technology is to use either manual or automated methods, including model-free and model-dependent methods, coupled with an ACOMP method and system, to actively control the trajectories of polymerization reactions and hence also the quality and properties of the final product. This is distinct from the multitude of empirical and chemometric models that have been developed for process control, in that the reaction and process control takes place in this technology by coupling the continuous ACOMP data on reaction and polymer characteristics to directly control polymerization process trajectories. There is no precedent for either manual active control or automatic active control of polymerization reactions using an ACOMP method or system.

Several definitions that apply throughout this disclosure will now be presented.

In the context of the invention the terms "process characteristic," "process trajectory," "process variable," "process parameter," "control," "active control," "manual active control," "automatic active control," "empirical," "model-independent," and "model-dependent," are frequently used and are defined herein.

A "process characteristic" refers to characteristics such as the instantaneous concentration of reagents in the process vessel, including, but not limited to monomer, co-monomers, polymer, initiators, branching and cross-linking agents, catalysts, degree of conversion or completions of a process or reaction. "Process characteristic" also refers to polymer dependent characteristics such as average, cumulative, and instantaneous values of weight average molecular weight $M_w$, reduced or intrinsic viscosity, $\eta_r$ and $[\eta]$, respectively, copolymer composition, and cumulative values of molecular weight distribution (MWD), polydispersity indices of MWD, reduced or intrinsic viscosity distributions, branching and cross-linking indices. The ultimate goal of the process is to produce desired or targeted "end product characteristics". End-product characteristics apply, but are not limited to, all of the above characteristics. In the context of this invention process characteristics are obtained by detectors making measurements on a continuous, diluted sample stream from the process vessel. The characteristics may be obtained directly from the detector, for example, but not limited to, continuous or digital output voltages, encoded data on scattering, absorbance, pressure, etc., and in some instances will be interpreted via automatic computations by a computing device receiving the detector information. Examples, not limiting, include the combination of light scattering intensity detection with concentration detection, via, but not limited to electromagnetic absorption (ultraviolet, visible, infra-red, microwave), refractometry, conductivity, and polarimetry, to obtain $M_w$ of a polymer. Data from a concentration detector can also be combined with a differential pressure transducer or other device sensitive to fluid viscosity under flow to obtain the reduced viscosity or intrinsic viscosity of a polymer.

A "process trajectory" is the time course of a process characteristic. For example, and not limiting, a plot of $M_w$ vs time would be the trajectory of $M_w$ for the process. The conversion of monomer or co-monomers plotted vs. time are also examples of trajectories of a process. Because the buildup of a product generally increases with time during a process it is also possible to use the trajectory of conversion or of amount of product in lieu of time as the independent variable. In such a case it is possible to plot, for example, and not limiting, $M_w$ vs conversion or vs amount or concentration of product. Hence control decisions can be based not only on time-dependent trajectories but on conversion-dependent trajectories, end product concentration trajectories, etc.

A "process variable" is a condition or agent that can affect the course of a reaction. Process "variables" include, but are not limited to, temperature, pressure, stifling type and rate, amounts and concentrations of monomer, co-monomers, initiators, catalysts, chain transfer agents, cross-linking agents, branching agents, quenching agents, surfactants, salts, pH, ionic strength, quenching agents, colloidal components, gases, and solvents. "Process variable" is often used synonymously with "process parameter", and in the context of this work "control variable".

"Control" here means changing the trajectory of a reaction by changing a process variable (or process parameter or control variable). This can involve introducing agents into the reactor, for example, but not limited to, using a pump or a gas stream, changing temperature, pressure, etc.

"Active control" refers to making changes to the control variables of a process during the process, based on information derived from monitoring based on continuous reactor extraction and dilution, in order to cause favorable changes in the process trajectory and process characteristics.

"Manual active control" refers to performing active control by means of a human decision maker. In this case a human receives the process characteristic information from a computer, graphical user interface, or other device capable of transmitting process characteristic information to a human. Based on 'experience', 'intuition', 'trial and error', or decisions based on computations made by the human or presented to the human by a computer or other device, the human makes the active control decisions for changing process variables. The human may actuate agent delivery devices such as, but not limited to pumps and gas streams, temperature, pressure and flow controllers. Actuation can occur via, but not limited to, activating 'soft' knobs or buttons on a computer graphical user interface, via buttons, levers, or other controls in a console. Additionally, the human can may make direct manual adjustment of non-computerized components such as, but not limited to, manual valves or physical insertion of materials into the reaction process. In this mode, model-free control decisions can be made in cases where the human does not make or receive data or computations to guide decisions in changing process control variables.

"Automatic active control" refers to active control carried out independently of human judgment and human actuation. In this case a computational device, such as a programmable logic controller, microcontroller, distributed control system, supervisory control and data acquisition (SCADA), or computer, receives the process characteristic information obtained by detectors making measurements on a continuous, diluted sample stream from the process vessel. The automatic controller may then make changes to the process variables in several ways.

"Empirical control", used here synonymously with 'model-free' or 'model-independent' control involves a controller making a decision to make a controlling intervention in the process when one or more process characteristics deviates by a defined amount, such as by a percentage, from the desired reaction trajectory. When the decision to make the control intervention is made, the human or automatic controller will use simple rules to decide which process variable or variables should change, and by how much. This does not require a kinetic and/or mass balance or other type of model, and is hence another example of model-free control. In this case, simple rules are programmed that allow the controlled to make incremental process variable changes in the right direction. For example, but not limiting, if the conversion must be accelerated to follow the desired trajectory then more initiator or catalyst can be added and/or the temperature increased (for thermally activated processes), if the reaction is to be decelerated some quenching agent (e.g. air for free radical reactions, quinones) can be introduced. If the $M_w$ or reduced or intrinsic viscosity are to be increased to follow the trajectory monomer concentration can increase and/or temperature decrease. If the $M_w$ or reduced or intrinsic viscosity are to be decreased a chain transfer can be added, more initiator added, and/or temperature increased. These increments can be made such that the controller estimates the expected changes on the process characteristics due to the changes in process variable(s) it has made and then decides to continue with more of that change, stop any changes, go in opposite directions of the changes, or make different changes, based on criteria of how the change affected the process. If the process variable change is expected to create a desired percentage change in the reaction trajectory over a certain period of time, the change is measured by the controller and the next decision made. Such estimations of expected changes for changes in process control variables need not rely on kinetic models, and may be purely empirical correlations. This is another example of model-free control. A human may supervise such operations and have the ability to intervene in automatic active control if necessary.

"Model dependent active control" means that the changes in process variable that are triggered by criterion-based deviations of the measure trajectory occur based on model dependent computations. As will be described below, there are kinetic, mass balance, and other physical parameters and equations that link the changes in time of process characteristics with these parameters, and how much these characteristics and rates of change will change when changes to the process variable are made either continuously or discretely. There can be great variation in the depth and detail of the models employed. In many cases simplified, robust models can be employed to obtain good estimates of needed process variable changes. These estimates, once applied, will then be scrutinized by the automatic controller to ensure that they cause the trajectory changes desired. If not, the automatic controller may either re-calculate the changes in process variables, or combine an empirical mode to make changes. In the latter case automatic control can be a hybrid of 'model-dependent' and 'model independent' control.

As used herein, the term "polymer" can also mean a colloid. That is, processes that produce polymers may correspond to processes that produce colloids. The term "colloids" can also encompass emulsions, suspensions, dispersions, nanoparticles, liposome, or any other similar colloidal material.

There are three main reactor types to which the subject matter of the present disclosure can be applied. The three main reactor types are batch reactors, semi-batch reactors, and continuous reactors.

In batch reactors, reagents are added at the outset of the reaction and the major control variables are temperature and quenching agents (for example, air in a free radical reaction). In these cases, temperature or metered amounts of quenching agent are varied in order to speed up or slow down a reaction, and also to control polymer MWDs and co-monomer compositions. In extreme cases, the quenching agent can be used to stop the reaction entirely. In some instances, pressure can also serve as a control variable in batch reactors.

In semi-batch reactors, reagents are added into a reactor as the polymerization reaction proceeds. 'Semi-batch,' as used herein, refers to the addition of any reagent during a reaction, whether discretely or continuously, that causes a change in one or more of the process characteristics. Semi-batch reactors are commonly used for solution phase and heterogeneous phase reactions. In at least one instance, semi-batch reactors using the presently described subject matter can be used in emulsion polymerization reactions. The purpose of the addition of reagents is to modulate and control the process characteristics during the reaction. The subject matter of the present disclosure is especially useful for semi-batch reactors since continuous monitoring allows the effects of adding reagents to be immediately detected and quantified, and to serve as a basis for subsequent reagent additions. In semi-batch reactors, temperature can also be changed as a process control variable. The type of agents frequently added to semi-batch reactors include, but are not limited to: initiators, catalysts, monomers, polymers, chain transfer agents, branching agents, cross-linking agents, fluids for colloidal suspensions, solvents, gases, and free radical scavengers.

In the case of both batch and semi-batch reactors involving multiple stages in a production process, the subject matter of the present disclosure can be used to control when transitions to the next succeeding stage are made. For example, not limiting, a common scenario in the production of block copolymers is to run a reaction in a first phase to produce a first block, then switch to a second monomer in a second stage so that the second monomer continues to polymerize onto the first block, thus creating a diblock copolymer. If a switch to a third monomer is made in a later stage a triblock copolymer will be produced, etc. The presently described subject matter, by continuously monitoring the consumption of monomer at each stage, and/or $M_w$ or reduced or intrinsic viscosity, will provide the information needed to make the control decision to pass to the reaction with the monomer for the next block.

In a continuous reactor, a steady state condition is reached in which polymer of constant characteristics, such as MWD or intrinsic viscosity distribution are maintained constant relative to time. At steady state, the ratio of monomer to polymer normally remains constant, in addition to other reagents, such as, but not limited to, catalysts, initiators, and branching agents. The presently described subject matter can be used to ensure steady state operation, by making corrections to reagent feeds in response to deviations from process characteristics, such as, but not limited to, deviations in $M_w$, MWD, reduced or intrinsic viscosity, level of monomer or co-monomer conversion from the steady state during steady state operation. Furthermore, the invention can be used to establish the steady state more efficiently when changing from one steady state condition to another. In the polymer manufacturing industry a steady state condition normally produces a certain product, and the changeover to another steady state normally corresponds to the changeover to another type or grade of product. Such changeovers typically last hours to tens of hours. In some cases the content of the process vessel may be transferred to another process vessel, such as, but not limited to, by a pump, where the next process stage occurs.

A description of the procedure used to actively control a polymerization reaction process is outlined below and can comprise seven steps. It is noted that the following procedure applies to batch, semi-batch, and continuous reactors. In the case of a batch reactor, temperature and quenching agents are the only main process control variables. In other instances stifling or agitation rates can be an additional or independent process control variable. In semi-batch reactor, reagent additions, in addition to temperature, quenching agent, and rate of stifling or agitation, can be process control variables. The procedure to actively control a polymerization reaction process can be as follows:

First, a reaction and process trajectory for each relevant polymerization process characteristic is established to yield the desired polymer product properties. This can be according to a preliminary computation of each trajectory, a non-computational estimate of the trajectory, a trajectory according to a known or established procedures or 'recipes,' or from historical knowledge of analogous reaction trajectories, or from knowledge of reaction trajectories known to yield acceptable polymeric products. In this step, there are many offline methods for linking final desired polymer properties to process steps in polymerization necessary to produce such desired final products. Mass balance and rate equations, together with expressions for kinetic chain length, chain transfer, and other processes can be solved numerically to show process paths and final products. There are also commercially available software products for linking final desired polymer properties to process steps in polymerization processes such as, for example, GPROMS® (http://www.psenterprise.com/gproms.html) and various software products from Aspentech (http://aspentech.com/).

In the case of a continuous reactor at steady state the trajectory for each process characteristic is especially simple, namely, each characteristic is constant in time (that is, the trajectory is a horizontal line vs time). When there is a change from one steady state to another there will be a time dependent trajectory bringing each process characteristic from the first steady state to the next. Such trajectories can be optimized, offline by various calculation methods, to provide trajectories which are most efficient in terms of time and feedstock consumption in changing from one steady state to another.

Second, at each instant of the reaction, or at defined intervals during the reaction, the relevant reaction and process characteristic(s) is(are) measured using the ACOMP method. The relevant reaction and process characteristic(s) can be, for example, $M_w$, MWD, monomer conversion, instantaneous average co-monomer composition, intrinsic viscosity, and residual monomer that is hundreds or tens of parts per million or less of monomer. Typical ACOMP sampling rates normally produce data which are smooth enough to be considered continuous and differentiable on a point-by-point basis. The actual sampling rate needed to produce continuous type data requires that there be a plurality of sample points between measurable differences in a monitored variable. For example, fractional monomer conversion ranges from 0 to 1 so that 1,000 points, for example, normally provides continuous type data. For a reaction lasting 1,000 seconds, a sampling rate of 1 Hz would produce this resolution. There are no fundamental limits on how fast or slow the sampling can be achieved, however sampling normally ranges between milliseconds and minutes per point. It is important to emphasize that in the presently disclosed subject matter, data need not be of the continuous type, and that while continuous type data may often be preferred, intermittent data can also be used for the control purposes.

Third, the values of the reaction and process characteristic(s) is(are) compared to those that should be obtained according to the established, ideal trajectory (for control of one polymerization process characteristic) or trajectories (in the case of control of more than one polymerization process characteristic).

Fourth, if there is a difference between the ideal trajectory, or trajectories, and the actual ACOMP monitored trajectory, the following steps are taken depending on whether a manual or automatic approach is utilized:

i) Model-free, or model-dependent, Manual active approach. A change or increment in one or more of the process variables is made that is known to bring the current trajectory or trajectories closer to the ideal or desired trajectory or trajectories. The change or increment can be made empirically (model-free) or by a model (model-dependent). The change can be made by the human controller changing process variables such as, but not limited to, transferring reagents or other chemical components into the process vessel, changing temperature, stirring, or pressure.

ii) Model free automatic approach. A change or increment in one or more of the process variables is made that is known to bring the current trajectory, or trajectories, closer to the desired trajectory. The size of the change(s) or increment(s) and which variable(s) is(are) changed/incremented automatically is determined according to a selection algorithm and carried out by automated mechanisms. The change can be made by the empirical automatic controller changing process variables such as, but not limited to, transferring reagents or other chemical components into the process vessel, changing temperature, stifling, or pressure.

iii) Model-dependent automatic approach. An analytical computation is made, by a computing device, using the governing equations of the reaction and polymer characteristics to determine what change(s) or increment(s) must be made to one or more controllable process parameters in order to correct the difference between the current trajectory and the ideal, or desired, trajectory over the next time interval. The computation can be performed either numerically, or, analytically in the case where the process is describable in terms of analytic functions. Once the computation of necessary process parameters changes is made changes to the one or more process parameters are carried out by automated mechanisms. The change can be made by the automatic controller changing process variables such as, but not limited to, transferring reagents or other chemical components into the process vessel, changing temperature, stifling, or pressure.

iv) The procedure continues to step 5 after completion of any one of i)-iii).

Fifth, the effect of the change on the trajectory, or trajectories, is monitored over a defined time interval to assess whether the change to the one or more process characteristics produces the desired convergence of the current trajectory or trajectories with the ideal trajectory or trajectories.

Sixth, steps 2-5 are repeated to keep the reaction as close to the ideal, or desired, trajectory, and until the reaction reaches its desired state of completion. The reaction is subsequently terminated.

Finally, for each reaction monitored and controlled, whether by the manual active, the empirical automatic, or the model-dependent computation approach, the reaction path, process variables changed and all other relevant ACOMP and reaction parameters can be stored and used to train an intelligent machine learning algorithm that, over time, can use the combination of scenarios and approaches to deliver an intelligent, optimized and automated control of reactions previously performed or substantially similar reactions.

In the above procedure, a 'change' in process variable (for example, amount of added reagent, or temperature or pressure) can be of any magnitude or, whereas 'increment' implies that process variables are established and are being changed incrementally from their current values. The increments can be applied continuously. For example, a reagent can be flowed continuously over a period of time comparable to changes taking place in the reaction process characteristic trajectories, or the temperature can be changed continuously over a period of time comparable to changes taking place in the reaction process characteristic trajectories. Alternatively, the increments can be applied discretely. For example, a certain amount of reagent can be added to the reactor over a short period of time, or rapidly, for example by a rapid injection of reagent into the reactor.

Figure 2:
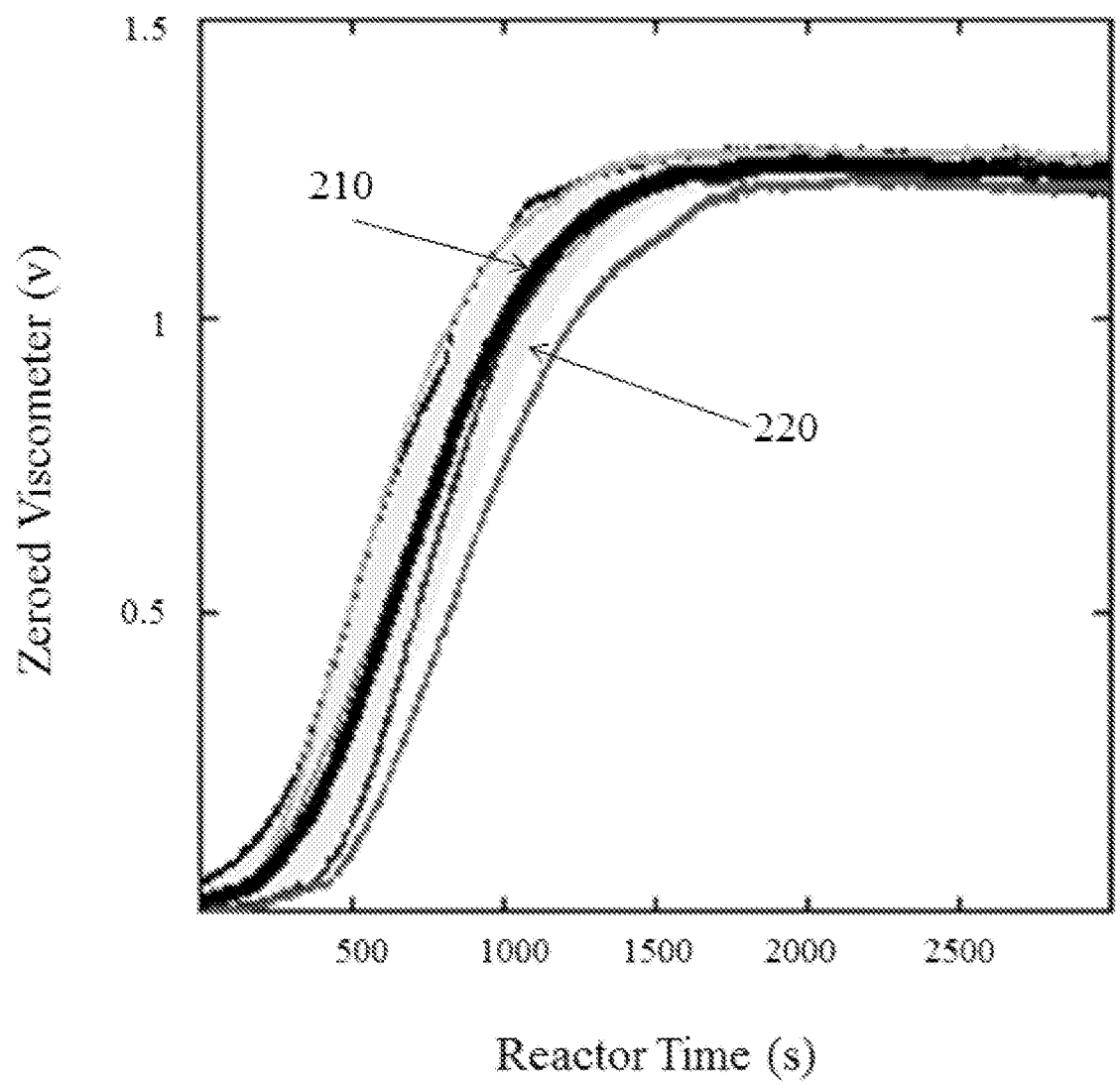
FIG. 2 is a diagram of exemplary of reaction trajectories of free radical polymerization reactions characterized in terms of intrinsic, hydrodynamic viscosity characteristics of the polymerization products in association with certain embodiments of the present disclosure.

FIGS. 1 and 2 illustrate examples of reaction trajectories from an ACOMP method for two different free radical polymerization reaction process characteristics: conversion of monomer (expressed as remaining ppm of monomer in the reactor, FIG. 1) and highly dilute solution viscosity (FIG. 2). FIG. 2 reflects the intrinsic, hydrodynamic viscosity characteristics of the polymers themselves rather than the bulk viscosity of the reactor or of a non-dilute polymer solution. The actual intrinsic viscosity is equal to the reduced viscosity ($\eta_r$) at very low polymer concentration and low shear rate. At each instant of time, the ACOMP monitoring yields $\eta_r$ by combining the data from both curves according to the following equation:

$$\eta_r(t) = \frac{\eta(t) - \eta_{solvent}}{C_p \eta_{solvent}} \quad (3)$$

where $\eta(t)$ is the highly dilute viscosity measured by ACOMP at each instant of time t, $\eta_{solvent}$ is the viscosity of the solvent carrying the polymer, and $C_p$ is the concentration of polymer in the highly dilute stream, obtained from the conversion (FIG. 1) and the dilution factor (FIG. 2). Generally, $\eta_{solvent}$ is measured on a solvent stream prior to initiating a reaction. For these particular data, $C_p$ was varied from 0, at t=0, to $2.6 \times 10^{-4}$ g/cm$^3$ by the end of the reaction when all monomer had been converted to polymer.

In both FIGS. 1 and 2, the thick black data curves 110 and 210 are the ideal trajectories and the other unnumbered curves are those of individual, separate reactions. While these reactions were monitored there was no active or passive control. Initiator flowed into the reactor in these reactions according to an established procedure, from which there was no variation. The procedure involved pumping initiator from a liquid reservoir at high concentration at a low flow rate into the reaction vessel. The presently described subject matter allows active control of individual reactions by knowing the ideal trajectory of the relevant polymerization process characteristics and either manually or automatically adjusting process control variables to promote the current trajectory to follow the ideal trajectory as closely as possible. For example, regarding conversion, where the conversion rate is faster than desired, the feed rate of initiator could be reduced. Upon reduction of the feed rate, the ACOMP monitoring will show how the current trajectory shifts in relation to the ideal trajectory. Alternatively, in the case where the conversion is too slow, the initiator feed rate can be increased.

FIGS. 1 and 2 also illustrate an example of where steps 1-7 above can be applied to achieve the ideal or desired reaction trajectories 110, 210. This example shows that a convenient means of controlling a reaction could be digitally or graphically based. That is, the desired reaction trajectory for each polymerization reaction process characteristic is shown as an ideal trajectory, along which the reaction is to be 'driven'. With this, an operator can 'drive' the reaction as close to the ideal trajectory as possible by changing or incrementing polymerization reaction process control variables. A margin of acceptable deviation from the ideal trajectory can also be established and the operator can drive the reaction within said margins. In FIGS. 1 and 2, the shaded areas 120, 220 are examples of the types of margins that might be used. It can be seen for both trajectories that some reactions lie wholly within the margins, others are outside, and some are partially within and partially outside the margins. The graphical approach described above is optional. Alternatively, analog or numerical values for the polymerization reaction process characteristics can be displayed for an operator, who can then control the current reaction trajectory in view of observed numerical values as compared to numerical values corresponding to ideal reaction trajectory, or a range of numerical of numerical values corresponding to an acceptable deviation from the ideal reaction trajectory. In the case of automatic control, measurement based controller(s) and feedback actuators may not require graphical data and can work in a fully analog or numerical fashion.

Representation of Reaction Trajectories and Control Thereof

The following description illustrates how the subject matter of the present disclosure can be used in any of the possible modes; manual active, empirical automatic, and model-dependent manual or automatic. The description addresses both automatic mode, and the manual active mode. For example, the equations described below can indicate how a process control variable must be changed in order to drive a polymerization reaction process characteristic in a desired direction. This is of immediate use for a manual operator providing active control. At the next level, if needed or desired, the equations described below can also provide quantitative estimates of how much a process control variable must be changed in order to change a polymerization reaction process characteristic by a desired amount. Such estimates can guide manual active and empirical automatic modes, and can provide the basis for model-dependent modes.

A convenient way of representing the control paradigm is to consider a polymer or polymerization reaction process characteristic P (such as, but not limited to, $M_w$, MWD, $\eta_r$, average or instantaneous copolymeric composition, composition drift, polydispersity indices, residual monomer, degree of branching, crosslinking, polyelectrolyte responsiveness, polymer stimuli responsiveness, or other similar polymerization reaction process characteristics) to be controlled. P(t), is a time-dependent function which represents the time-dependent trajectory of P. P(t) also depends on other process control variables besides time, $x_1, x_2 \ldots x_N$, of N variables besides time; $P=P(t; x_1, x_2 \ldots x_N)$, where $N \geq 1$. A change in P with respect to any process control variable is expressed by the total differential:

$$dP = \sum_{i=1}^{N} \frac{\partial P}{\partial x_i} dx_i \qquad (4)$$

As discussed above, the goal of ACOMP active control is to achieve any desired trajectory P(t). It is important to note that $x_i$ can be temperature dependent. For example, if $x_i$ is the concentration of free radicals provided by a thermal initiator (for example, organic and inorganic peroxides, azo-initiators, vaso-initiators, persulfates, etc), this depends both on the concentration of initiator of a given type in the reactor as well as the temperature (T).

It is convenient to consider the change in P in equation 4 in terms of the gradient of P, which is calculated in an N-dimensional orthogonal space spanned by the variables $x_1, x_2, \ldots x_N$ with unit vectors $\hat{x}_1, \hat{x}_2, \ldots, \hat{x}_N$ given by the following equation:

$$\nabla P = \sum_{i=1}^{N} \frac{\partial P}{\partial x_i} \hat{x}_i \qquad (5)$$

The change dP is then expressed as follows:

$$dP = \nabla P \cdot d\vec{S} \qquad (6)$$

where $d\vec{S}$ is the reaction trajectory control increment (or process control increment), respectively as expressed below:

$$d\vec{S} = \sum_{i=1}^{N} dx_i \hat{x}_i \qquad (7a)$$

This representation hence allows the 'natural' variables that control the property P to be expressed in terms of $\nabla P$, and the active intervention in terms of the reaction trajectory control increment $d\vec{S}$. $d\vec{S}$ can be made by making increments in one or more of the variables. Selection of $d\vec{S}$ is made in step 4) above and then the manual controller or automation mechanism applies $d\vec{S}$ to the reaction.

Because $d\vec{S}$ and the various $dx_i$ are mathematically infinitesimal quantities, it is important to specify that, in the real world application of the disclosed subject matter, the process control variables will be incremented by finite amounts, as opposed to infinitesimal amounts. Hence, equation 7a can be expanded from infinitesimal increments $dx_i$ to finite increments (whether by a discrete addition or change in a process variable or over time, as by a flow or gradual temperature change) to achieve a discrete reaction trajectory control increment $\Delta \vec{S}$ caused by increment(s) in the control variables $\Delta x_i$. The discrete reaction trajectory control increment $\Delta \vec{S}$ is then defined with the following equation:

$$\Delta \vec{S} = \sum_{i=1}^{N} \Delta x_i \hat{x}_i \qquad (7b)$$

Where change in a process control variable is made by flow, it will still be possible, for the purposes of calculation to integrate infinitesimal quantities $dx_i$ over time, to achieve a finite change $\Delta \vec{S}$ by the $\Delta x_i$ produced over finite time intervals, such as from t1 to t2, where $$\Delta x_i = \int_{t1}^{t2} \frac{dx_i}{dt}(t) dt \qquad (7c)$$

An example of a polymerization reaction process characteristic is the reaction rate. In a free radical reaction, the reaction rate (Ra) is given by the following:

$$Ra = \left| \frac{d[m]}{dt} \right| = k_p[m][R] \qquad (8)$$

It can be immediately seen, for example, that doubling either [m] or [R] will double Ra. In this case $\Delta[m]=2[m]_0-[m]_0=[m]_0$, where $[m]_0$ is the monomer concentration before the addition of the increment $\Delta m$. The same holds for $\Delta[R]=[R]_0$ to double rate via a change in [R].

In terms of the formalism $$\nabla Ra = k_p[R]\hat{m} + k_p[m]\hat{R} + [m][R]\hat{k}_p \qquad (9)$$

and, according to equation 6, the change in Ra that occurs for a given $d\vec{S}$ is as follows:

$$dRa = k_p[R]d[m] + k_p[m]d[R] + [m][R]dk_p \qquad (10)$$

Since both [R] and $k_p$ are temperature dependent, T is added as a process control variable as follows:

$$dRa = k_p[R]d[m] + k_p[m]d[R] + [m][R]dk_p + \left\{ \frac{\partial k_p}{\partial T} + \frac{\partial [R]}{\partial T} \right\} dT \qquad (11)$$

The complete process control increment in this case is then defined as follows:

$$d\vec{S} = d[m]\hat{m} + d[R]\hat{R} + dk_p \hat{k}_p + dT\hat{T} \qquad (12)$$

where d[m] can be controlled by adding monomer d[m], either incrementally or over a period of time if there is a flow of monomer into the reactor, and [R] can be controlled both by adding initiator $I_2$ to the reactor, which decomposes into radical R as follows:

(13)

In equation 13, $k_d$, the initiator thermal decomposition rate, is exponentially sensitive to temperature for thermal initiators, and is usually well known and freely obtainable ($k_d = ae^{-bT}$, where a is a constant with units of $k_d$, and b is a constant for a given initiator with units of inverse temperature). $k_t$ in equation 13 can also be sensitive to temperature but is generally substantially less sensitive than $k_d$. The propagation rate ($k_p$) can also be sensitive to temperature, but generally substantially less sensitive to changes in T than $k_d$. For example, the reactor liquid viscosity, which can change $k_p$, can change with T. The temperature dependence of $k_p$ is often publicly available from experimental or computational data sources.

Equation 11 allows for decisions on the form of $d\vec{S}$ in equation 12, and the actual increments of d[m], dT, and other variables can be decided on the basis of practical considerations (such as, which increment is easiest to change) and if and how changes to the variables affect other polymerization reaction process characteristics. For example, increasing [R] results in an increased reaction rate and also increased molecular weights of the produced polymer chains.

In the latter regard, another good non-limiting example of a polymerization reaction process characteristic is of kinetic chain length which governs the instantaneous value of the molecular weight. At constant temperature T, expressed as follows:

$$\nabla v = \frac{k_p}{k_t[R] + k_3[G]}\hat{m} - k_t\frac{k_p[m]}{(k_t[R]+k_3[G])^2}\hat{R} - k_3\frac{k_p[m]}{(k_t[R]+k_3[G])^2}\hat{G} + \frac{[m]}{k_t[R]+k_3[G]}\hat{k}_p - \frac{k_p[m][R]}{(k_t[R]+k_3[G])^2}\hat{k}_t - \frac{k_p[m][G]}{(k_t[R]+k_3[G])^2}\hat{k}_3 \quad (14)$$

and $$d\vec{S} = d[m]\hat{m} + d[R]\hat{R} - d[G]\hat{G} + dk_p\hat{k}_p + dk_t\hat{k}_t + dk_3\hat{k}_3 \quad (15)$$

where $d\vec{S}$ is most directly controlled by increments in [m], [R] and [G]. The rate constants under given reaction conditions do not normally change. However, they are normally sensitive to temperature T, as are usually [R] and sometimes [G], so that $d\vec{S}$ can be written, including possible change in T as expressed by the following equation:

$$d\vec{S} = d[m]\hat{m} + \left(d[R] + \frac{\partial[R]}{\partial T}dT\right)\hat{R} - \left(d[G] + \frac{\partial[G]}{\partial T}dT\right)\hat{G} + \left(\frac{\partial k_p}{\partial T}\hat{k}_p + \frac{\partial k_t}{\partial T}\hat{k}_t + \frac{\partial k_3}{\partial T}\hat{k}_3\right)dT \quad (16)$$

Equation 16 is useful where the temperature dependencies of the rate constants are known, including $k_d$, the decomposition rate constant for initiator (which is usually well known and publicly available in tabulated and graphical forms, in books, reviews, and on the Internet).

An incremental change in chain length is then given by the following equation:

$$dv = \frac{k_p}{k_t[R]+k_3[G]}d[m] - k_t\frac{k_p[m]}{(k_t[R]+k_3[G])^2}d[R] - k_3\frac{k_p[m]}{(k_t[R]+k_3[G])^2}d[G] + \left[-k_t\frac{k_p[m]}{(k_t[R]+k_3[G])^2}\frac{\partial[R]}{\partial T} - \right. \quad (17)$$

-continued
$$\left. k_3\frac{k_p[m]}{(k_t[R]+k_3[G])^2}\frac{\partial[G]}{\partial T} + \frac{[m]}{k_t[R]+k_3[G]}\frac{\partial k_p}{\partial T} - \frac{k_p[m][R]}{(k_t[R]+k_3[G])^2}\frac{\partial k_t}{\partial T} - \frac{k_p[m][G]}{(k_t[R]+k_3[G])^2}\frac{\partial k_3}{\partial T}\right]dT$$

Equation 17 can be re-written in terms of the fractional change in chain length as follows:

$$\frac{dv}{v} = \frac{1}{[m]}d[m] - \frac{k_t}{(k_t[R]+k_3[G])}d[R] - \frac{k_t}{(k_t[R]+k_3[G])}d[G] + \left[-k_t\frac{\partial[R]}{\partial T} - k_3\frac{\partial[G]}{\partial T} + \frac{1}{k_p}\frac{\partial k_p}{\partial T} - [R]\frac{\partial k_t}{\partial T} - [G]\frac{\partial k_3}{\partial T}\right]\frac{dT}{(k_t[R]+k_3[G])} \quad (18)$$

Equation 18 illustrates that a positive increment in chain length can be achieved by an incremental increase in [m], and that the fractional increase in chain length is equal to the fractional change in monomer concentration. A negative increment in chain length, to produce shorter chains, can be achieved by incremental changes in [R] and/or chain transfer agent concentration [G]. As can be seen, the effect of changing T is potentially complex as up to five parameters can change with T, and the net effect on chain length can be positive or negative.

When an incremental change, or change over time, to a process control variable is made, the effect on the polymerization reaction process characteristic is usually 'immediate.' That is, as soon as the full change has taken place (for example, a specific increment of reagent added, the temperature has been changed and stabilized, the agitation or stifling rate changed, etc.) and is distributed throughout the reactor, the impacted variable in the governing equations change correspondingly. For example, as described above, if the amount of [m] is doubled, equation 8 predicts that Ra will be doubled as soon as the doubling of [m] occurs.

Figure 3:
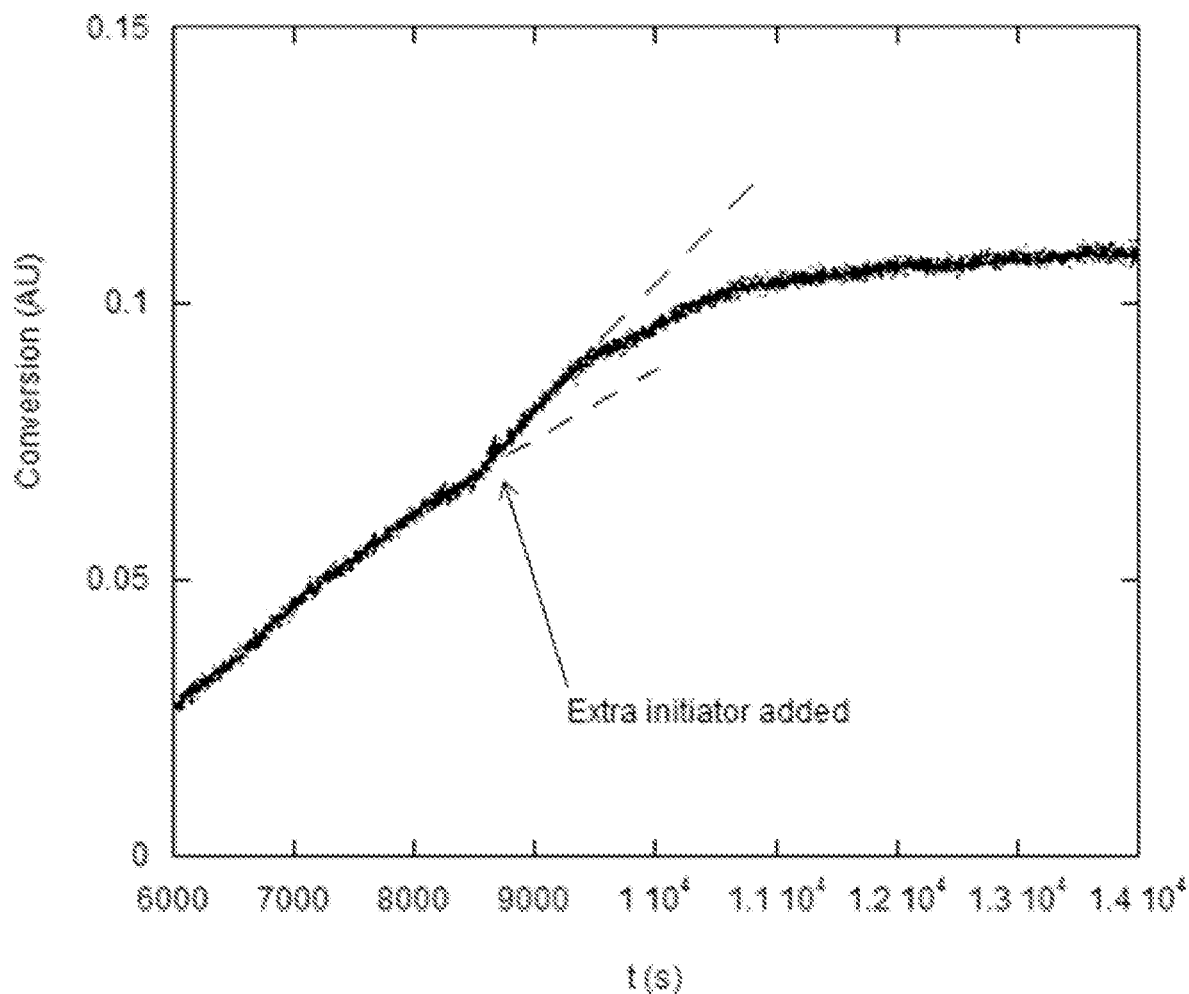
FIG. 3 is a diagram of a free radical reaction involving the homopolymerization of methyl methacrylate under monitored by an ACOMP system in association with certain embodiments of the present disclosure.

A non-limiting example of changes to the governing equations can be extracted from data by Alb et al. in "Simultaneous continuous, non-chromatographic monitoring and discrete chromatographic monitoring of polymerization reactions", *J. Appl. Polym. Sci.*, Vol. 13, pp. 190-198 (2009), the contents of which are herein incorporated by reference. In Alb et al., a free radical reaction involving the homopolymerization of methyl methacrylate was allowed to progress under ACOMP monitoring (FIG. 3). As shown in FIG. 3, at 8,500 seconds a discrete extra amount of initiator ($I_2$) was added to the reaction. As predicted by equation 8, this addition of $I_2$, leading to an increase of [R] by equation 13, is quickly manifested in an increase of Ra, seen as an increase in the slope of relative conversion (obtained by a refractometer in the ACOMP detection train). This initiator boost was not controlled, nor was it meant to make the reaction follow a desired conversion trajectory, nor was it meant to produce any quantitatively predicted trend. This type of addition of extra initiator, an 'initiator boost', is frequently used in industry to speed up reactions and to reduce the residual amount of monomer at the end of the reaction. Since ACOMP has not existed industrially until 2014, there has never been the opportunity to apply the subject matter of the present disclosure to actively control and monitor polymerization reaction processes.

The current invention involves active control of a reaction or process in order to achieve a desired reaction trajectory and/or desired end product of the reaction or process. Monitoring the change that occurs in a reaction or process due to a change in process variable without the motive of control of a reaction or process trajectory or the motive of obtaining a desired end product of the reaction or process is not the subject of the current invention.

Other agents that can be added incrementally or periodically or flowed into a reactor for reaction and serving as variables for process control include, but are not limited to:
1) Monomers, to control molecular weight (one of ordinary skill may readily appreciate that control of molecular weight may also largely control intrinsic viscosity);
2) Co-monomers, to control the polymer composition and final product properties related thereto;
3) Chain transfer agents, which are generally used to shorten chains and control MWD;
4) Free radical initiators, under thermal decomposition control, to control reaction rate and also affect MWD;
5) Other forms of initiators, such as those used in controlled radical polymerizations (CRP), such as Reversible Addition-Fragmentation chain Transfer (RAFT), Nitroxide Mediated radical Polymerization (NMP), Atom-Transfer Radical-Polymerization (ATRP), Ring-Opening Metathesis Polymerization (ROMP), or any other similar polymerization techniques;
6) Redox coupled reagents, for initiation reactions which do not depend on thermal decomposition;
7) Branching agents, to control branching and cross-linking of polymers, which can change MWD and can alter chain architecture leading to differential control of MWD and [n];
8) Surfactants, to emulsify or invert the phase of reactor solutions;
9) Post-polymerization procedures such as, for example, grafting of polymers or other materials onto the polymer backbone, PEGylation, or chemical blending or formation of chemical formulations involving the polymers reacting together;
10) Solvents, either of the same type used during a solvent based reaction, or a different solvent from the initial solvent; and
11) Gases which can be used to purge or enhance a reaction (For example, $N_2$ for purging), or to slow or stop reactions (for example, air or $O_2$). In many cases, the monomers themselves exist as a gas at certain pressures and temperatures. For example, ethylene, propylene, butylene and other alkylenes can exist as a gas at certain pressures and temperatures.

Additional methods of controlling the reactor include changing process control variables such as temperature, pressure, exposure to light or other radiation, or changing the rate or type of agitation or stifling, or any other method of changing reaction conditions known to one of skill in the art. Ultraviolet light (UV), for example, has been shown useful to initiate polymerization reactions, in lieu of chemical initiation, and the subject matter of the present disclosure will also allow for control of the reaction via controlled dosing by UV radiation.

In some embodiments, a reactor is chosen, whose volume can be in the range of a few milliliters to hundreds of thousands of liters. Such reactors can be made of glass, a metal such as, for example aluminum, a metal alloy such as, for example, stainless steel, a plastic, or any other suitable reactor material. The shape of the reactor can be cylindrical, tubular, box-like, or other suitable shape, and can be constructed of one or more pieces. For example, the reactor can have a removable top or bottom, flanges, valves, etc. The reactor must have a means of allowing reactor contents, such as reagents or other chemical components or polymerization reaction process products, to be withdrawn continuously. This means of allowing reactor contents to be withdrawn continuously can be, for example, but not limited to, a recirculating sampling loop, a slip stream, a direct sampling port, or any other suitable means of extraction from the reactor. Extraction can occur under innate flow or pressure in the reactor with a valve including elements such as, but not limited, a ball, a butterfly, a ceramic disk, a check, a choke, a diaphragm, a gate, a globe, an isolation, a knife, a needle, a pinch, a piston, a plug, a pressure reduction, a sampling, etc., or with a gas or liquid mass flow controller, or by means of an active extraction device such as a pump including elements such as but not limited to, a rotary gear, a rotary lobe, a gear, a rotary vane, a flexible impeller, a single or multiple piston, a centrifugal, a peristaltic, a lobe, a screw, a progressing cavity, a roots-type, a plunger, a diaphragm, a rope, a valveless type pump, and a slot type pump. The reactor, as discussed above, can be of the batch, semi-batch (also termed 'semi-continuous'), or continuous type. Extraction rates of fluid from the reactor typically are in the range, but not limited to, 0.010 milliliters per minute up to, but not limited to, 10 milliliters per minute.

The extracted reactor contents, such as reagents or other chemical components or polymerization reaction process products, can then be diluted to any degree. In some cases, very little or no dilution may be desired. In some embodiments, the reaction in the reactor takes place in water but it may be desired to measure a property of the reaction, such as the intrinsic viscosity of the polymer, for example a polyelectrolyte whose intrinsic viscosity is very sensitive to ionic strength, under a controlled ionic strength. In such a case, it may be determined that a 0.010M NaCl solution would provide an appropriate ionic strength. A NaCl reservoir may contain a 4M NaCl solution. It would then only be necessary to add one part in 400 of the reservoir to the continuous extraction stream to obtain a 0.010M NaCl stream. This amount to a dilution of 1.0025 times, would cause only a negligible change in the reactor contents in the final, 'diluted' stream.

The dilution itself takes place in some type of dilution apparatus. These include, but are not limited to, high and low pressure mixing chambers, laminar and turbulent mixers, centrifugal and stirred mixers, mixers at atmospheric pressure, etc. Volumes of the mixing chambers are determined by flow rates and desired time responses. A typical low volume, high pressure mixing chamber has 5 microliters to 1 milliliter of volume, whereas other mixing chambers may have volumes as high as 100 milliliters, and in some cases (of very high flow rates) even higher. The requirement for dilution is that all or part of the continuously extracted stream from the reactor be introduced into the mixing chamber, typically through metal or polymeric tubing with a pump, while one or more streams of desired dilution solvent is introduced simultaneously into the mixing chamber, normally by a pump, but other means can be used, such as gravity or pressure driven flow with or without a control valve or active flow controller. Mixing occurs via, but not limited to, turbulent flow, agitator with impeller, mixing with a stir bar, using a rotor or centrifugal mixer. Partial or final conditioning may also occur in the mixing chamber. Some examples of conditioning that may occur in the mixing chamber include, but are not limited to, degassing off bubbles coming from the reactor and/or the mixing, evaporating a solvent arriving in the extracted reactor stream (e.g. hexane, iso-octane), evaporating monomers arriving in the extracted reactor stream (e.g. ethylene, propylene, butylene) to perform a solvent transfer of the reactor contents into a new solvent, adding agents into the dilution stream such as surfactants to solubilize components of the extracted stream, to invert the extracted stream's phase (e.g. from a continuous oil phase to a continuous aqueous phase using a 'breaker surfactant'), precipitating out salts from the extracted reactor stream, providing a desired dilution solution different from that of the extracted reactor stream, which can consist of any desired solvents, or mixture of solvents, and added agents such as salts, surfactants, molecular probes (e.g. fluorescent or UV absorbers), polymers, colloids, etc. Multiple mixing chambers may also be used, and can be of the same type or of different types.

In some embodiments, and at the other extreme, is the case where a polymer produced in bulk, such as polystyrene or nylon, can be diluted to $10^{-4}$ g/cm$^3$ for measurement of molecular weight or intrinsic viscosity. In this case the dilution is approximately 10,000 times.

The term 'conditioning' can apply to any number of steps made to the extracted liquid which prepare it for subsequent analytical measurements in the detector stream. 'Conditioning' is not always required but is frequently used and can take many forms. The net effect of continuous extraction, dilution, and conditioning is to create a dilute polymer solution on which one or more detectors can make continuous or intermittent measurements. A non-limiting example of continuous measurements is where a detector makes continuous (e.g. analog) or rapid measurements on the diluted, conditioned stream flowing through it. 'Rapid' means that data points are gathered with time intervals between them which are much shorter than the time for the entire reaction or process to occur. For example, for a reaction lasting one thousand seconds, 'rapid' sampling could be each second, each tenth of a second or another similar period of time. In general, the number of data points a detector makes during a reaction or process can be on the order of one thousand.

On the other hand, intermittent measurements can be those in which relatively few points are made during the length of the reaction or process. An example, not limiting, is where the intermittent measurement is a chromatographic separation process such GPC, SEC, HPLC, or non-chromatographic separation process, in which a portion of the continuous, dilute, conditioned sample stream is introduced at time intervals into the separation device. An example of this, not limiting, is where the device is a GPC system with a chromatographic column that required 5 minutes for a separative analysis to be made. In this case only three analyses could be made during a 1,000 second reaction or process and these are hence not considered 'rapid'. A rough definition of 'intermittent' measurement is where the number of measurements made during a reaction or process is considerably less than one hundred.

Another example of an intermittent measurement is where the process of continuous extraction and conditioning takes place intermittently. In such a case a continuous, dilute, conditioned stream, and the corresponding measurements either rapid, or themselves intermittent, are carried out during two or more intervals of a reaction. An example, not limiting, is where a reaction or process may take 24 hours to complete. It may be determined that intermittent sampling is sufficient, and that such measurements would be made every half hour, providing considerably less than one hundred data points during the reaction or process. Each half hour the system for continuous extraction, dilution, and conditioning would be engaged, producing a continuous diluted, conditioned stream on which measurements by one or more detectors would be made either continuously or intermittently (e.g. using a chromatographic separation), as described above.

Some non-limiting examples include: a surfactant can be used to invert the phase of an inverse emulsion in order to homogenize the surfactant; A solvent such as tetrahydrofuran (THF) or dimethylformamide (DMF) can be used to homogenize an emulsion; A solvent might be used to precipitate out a salt that is in solution in the reactor; a volatile monomer or solvent component from the reactor may be volatilized, for example by applying heat prior to, or during, a mixing stage; the diluted stream may be filtered; a conditioning stage can be used to separate the conditioned contents, such as reagents or other chemical components or polymerization reaction process products, of different densities; an electrode may be used to remove metal ions, and so on.

The diluted, and where appropriate, conditioned, stream can then be measured continuously or intermittently, as desired. This stream is introduced to a means of continuous measurement via, for example, but not limited to, a pump, a pressure driven flow or other flow. This means of continuous measurement can include the use of detectors with flow cells, such as multi-angle static light scattering, refractometer, viscometer, UV/visible absorption, fluorescence, turbidity, circular dichroism, polarimeter, or any other suitable means of continuous measurement. From these measurements, often combined, properties of the reaction and polymers can be determined. These properties can include, but are not limited to, kinetics, conversion of monomers and co-monomers, composition drift, molecular weight, intrinsic viscosity, presence of particulates, etc. A non-limiting example of a combined measurement is light scattering with concentration detection. Another non-limiting example of a combined measurement is concentration with viscometry for determination of intrinsic viscosity. A non-limiting example of intermittent measurement means is Gel Permeation Chromatography (GPC) into which the diluted, conditioned stream can be injected automatically or manually at desired intervals using the same dilutes and/or conditioned stream from ACOMP. The desired interval can be, for example, ten minutes. The desired interval can alternatively be 1 minute, alternatively, 5 minutes, alternatively 15 minutes, and alternatively 30 minutes.

GPC allows full molecular weight distributions (MWD) to be measured. Hence, there can be instances when incorporating intermittent GPC into the ACOMP stream can provide useful checkpoints along a reaction trajectory and allow for finer control, either manually or actively. For example, while following and actively controlling a reaction, an intermittent GPC can indicate the shape and width of the MWD. This can allow control measures to be taken to further control the shape the MWD, such as adding width or adding more molecular weights in a certain part of the MWD.

While ACOMP continuous measurements do not furnish MWD directly, instantaneous values of weight average molecular weight and weight average reduced viscosity, $M_{w,inst}$ and $\eta_{red,w,inst}$, respectively, can be computed at each instant according to $$M_{w,inst} = \frac{d(C_p M_w)}{dC_p} \tag{27a}$$

$$\eta_{red,w,inst} = \frac{d(C_p \eta_{red,w})}{dC_p} \tag{27b}$$

where $C_p$ is the concentration of polymer at any time during the reaction and $M_w$ and $\eta_{red,w}$ are the cumulative values of weight average molecular weight and reduced viscosity, respectively, at any time during the reaction. In the limit of low polymer concentration in the diluted solution, the weight averaged reduced viscosity becomes the weight averaged intrinsic viscosity $[\eta]_w$. When controlling reactions based on molecular weight or reduced (or intrinsic) viscosity, higher resolution can be obtained using the instantaneous values. Furthermore, a MWD, and/or reduced viscosity distribution (RVD), can be built up at each instant by collecting the instantaneous values over short intervals of $C_p$, which yields a histogram or other desired representation of MWD and RVD. While the MWD and RVD collected this way do not offer the resolution of a full GPC separation, they nonetheless give robust measures of the shape and width of the MWD and RVD. These representations can hence serve in lieu of GPC in controlling shape and width of MWD and RVD. It is noted that for batch reactors equation 27 can be written as $$M_{w,inst} = \frac{d(fM_w)}{df}, \text{ and } \eta_{red,w,inst} = \frac{d(f\eta_{red,w})}{df} \qquad (28)$$

where f is fractional conversion.

The operation up to this point, including the computation of reaction and polymer properties and characteristics, can be achieved by any of the embodiments of the ACOMP method described above.

For batch and semi-batch reactors, the technology adds the sequence of steps outlined herein from the above procedure used to actively control a polymerization reaction process. It is decided before the reaction begins what reaction trajectory, or trajectories, shall be followed in order to produce a desired product. This can involve determination of how any one or more of the following, not taken as limiting, should proceed in time: conversion of monomers, rates of reactions, conversion of co-monomers in copolymerization reactions, weight average molecular weight $M_w$, MWD, intrinsic viscosity, branching, composition of copolymers, or residual monomer remaining at the end of the reaction.

A preliminary trajectory plan, which can correspond to an ideal or desired reaction trajectory, is established using approximate values for process variables or simply according to a known procedure, such as a published or industrial procedure, or by using an offline predictive model scheme (such as, for example, GPROMS® or an Aspentech software package). Alternatively, with sufficient historical data from previous polymerization reaction processes using the ACOMP method, the reaction path can also be determined based on an ideal trajectory from the historical database. A combination of the above procedures, that is, approximate values, offline predictive models and historical ACOMP data, can be utilized. Process control variables can include, but are not limited to, concentration of reagents including, but not limited to, monomers, co-monomers, initiators, catalysts, co-catalysts, inhibitors, chain transfer agents, cross-linking agents, surfactants, fluids for colloidal suspensions, salts, specific ions, radical quenchers, air, specific gases, etc., and temperature, pressure, irradiation, mechanical agitation or stirring, application of ultrasound, or any other similar process control variable one of ordinary skill desires to change in a polymerization reaction process.

As the reaction proceeds, one or more process control variables can be actively changed by model-free or model-dependent manual active or model-free or model-dependent active automatic modes. The presently described subject matter, as described above, provides an outline for one non-limiting method of determining how an increase or decrease of any given process variable will affect the polymerization reaction process characteristics of interest. Optionally, for any of the control modes, the governing equations for the reaction kinetics and associated polymer properties are solved to yield which increments of which process control variables can be applied in order to correct the current trajectory and drive it towards the ideal or desired trajectory. As a non-limiting example, it may be desired to keep molecular weight constant throughout a reaction ($M_w(t)$=constant). This can be achieved through a semi-batch feed of monomer into the reactor or, in some instances, by use of a chain transfer agent. As the reaction proceeds, if $M_w(t)$ deviates from its desired value by a specified amount, any of the modes mentioned (model-free or model-dependent manual active mode, or model-free or model-dependent automatic mode) can be used to adjust $M_w(t)$ towards its constant value. The specified deviation can be for example, up to 5%. The specified deviation can alternatively be up to 0.1%, alternatively up to 1%, alternatively up to 2.5%, and alternatively 10%. Optionally, computations can be made on how the flow rate of monomer should be changed in order to bring $M_w(t)$ towards its constant value. In the case of a batch reaction, the amount of chain transfer agent needed can be computed and changed discretely to bring $M_w(t)$ towards its constant value.

In another instance, it may be desirable to change $M_w(t)$ over time in order to produce a desired molecular weight distribution (MWD). For some polymers it is desirable to have significant polydispersity. That is, it is desirable that some polymers exhibit a range of molecular weights that can favorably affect properties such as extrusion and processability, or mechanical properties. In some instances a bimodal or multimodal MWD is desired. No matter which MWD is desired, before the reaction starts, the trajectory $M_w(t)$ is computed. The computed $M_w(t)$ trajectory will yield the desired MWD, and an approximate scheme for achieving the $M_w(t)$ trajectory can be established, such as controlling the time dependent flow rates of monomer(s) and/or initiator(s). As the reaction proceeds, whenever there is a deviation by more than a specified amount from the $M_w(t)$ trajectory, any of the modes mentioned (model-free or model-dependent active manual mode, or model-dependent active automatic mode) can be used to adjust MA towards its ideal or desired trajectory. The specified deviation can be, for example, up to 5%. The specified deviation can alternatively be up to 0.1%, alternatively up to 1%, alternatively up to 2.5%, and alternatively 10%. In model-dependent mode a computation is made which determines what increment of a process variable is needed to alter the trajectory toward the target trajectory.

Another non-limiting example can be in the control of a copolymer composition. A copolymer consists of two or more chemically distinct monomeric species. Chemically distinct monomeric species often react at different rates with each other. In this case, it may be desired to produce chains having fixed copolymer compositions, or, in contrast, it may be desired that there be a distribution of compositions, such as a broad composition distribution or a multimodal composition distribution. In this case, the trajectory of the concentration of each co-monomer is determined in order to achieve the desired composition distribution. When the reaction starts, if there is a deviation of composition beyond a certain amount, any of the three modes mentioned (manual active, empirical automatic, and analytical automatic) can be used to adjust the current concentration trajectories back to the ideal or desired concentration trajectories. The specified deviation can be for example, up to 5%. The specified deviation can alternatively be up to 0.1%, alternatively up to 1%, alternatively up to 2.5%, and alternatively 10%. Optionally, the governing equations are solved in order to determine the increments of one or more process control variables, such as the flow rate of each co-monomer into the reactor, required to drive the current concentration trajectories of each monomer back to the desired or ideal concentration trajectories of each monomer in any of the three modes of operation.

In instances where an individual or manufacturer frequently makes the same product, it is expected that the knowledge gained from applying any of the three modes of active control will result in certain patterns and 'rules' for changing process variables in response to deviations of reactions from desired trajectories. In this case, active control may use databased or 'historically' based control, whereby these latter methods make use of the learning achieved from the original model-dependent based active control. In many situations the implementation of active control in any of the three modes may have the goal of developing a database or historically based control, which is then considered a product of this invention. This mining of historical control data can be done automatically by a machine learning algorithm, as previously described, such that a new form of control can be implemented utilizing long-term optimized control data from the historical database as a new control setting. This new control setting would still utilize ACOMP data as the basis for control for the given reaction.

Active control can be accomplished using a control device. The control device can have several embodiments. The control device allows the continuous data on the progress of the process characteristics, yielded by the monitoring system, to be used to make control decisions either manually or automatically. The control device accepts input so that a decision can be made concerning which, if any process variables are to be varied and by how much. The process characteristics can include, but are not limited to, monomer conversion, concentration of monomer, comonomers, and polymers, weight average molecular weight, molecular weight distributions, reduced or intrinsic viscosity, reduced or intrinsic viscosity distributions, temperature, and pressure. The decisions about which and how much any process parameters are to be varied can be made actively manually, by an operator using manual controls, or actively automatically by empirical adjustment of these parameters, or analytically, by computing and applying the appropriate increments of which parameters to vary. On the basis of the decisions made, the controller can make changes to the process parameters; delivery devices such as pumps can be used to deliver controllable amounts of reagents, solvents, and other materials to the reactor, temperature controllers can alter temperature, gas feeds can allow gases that accelerate, decelerate or stabilize reactions to be fed in, or gases that are themselves monomers (e.g. ethylene, propylene, butylene).

Figure 4:
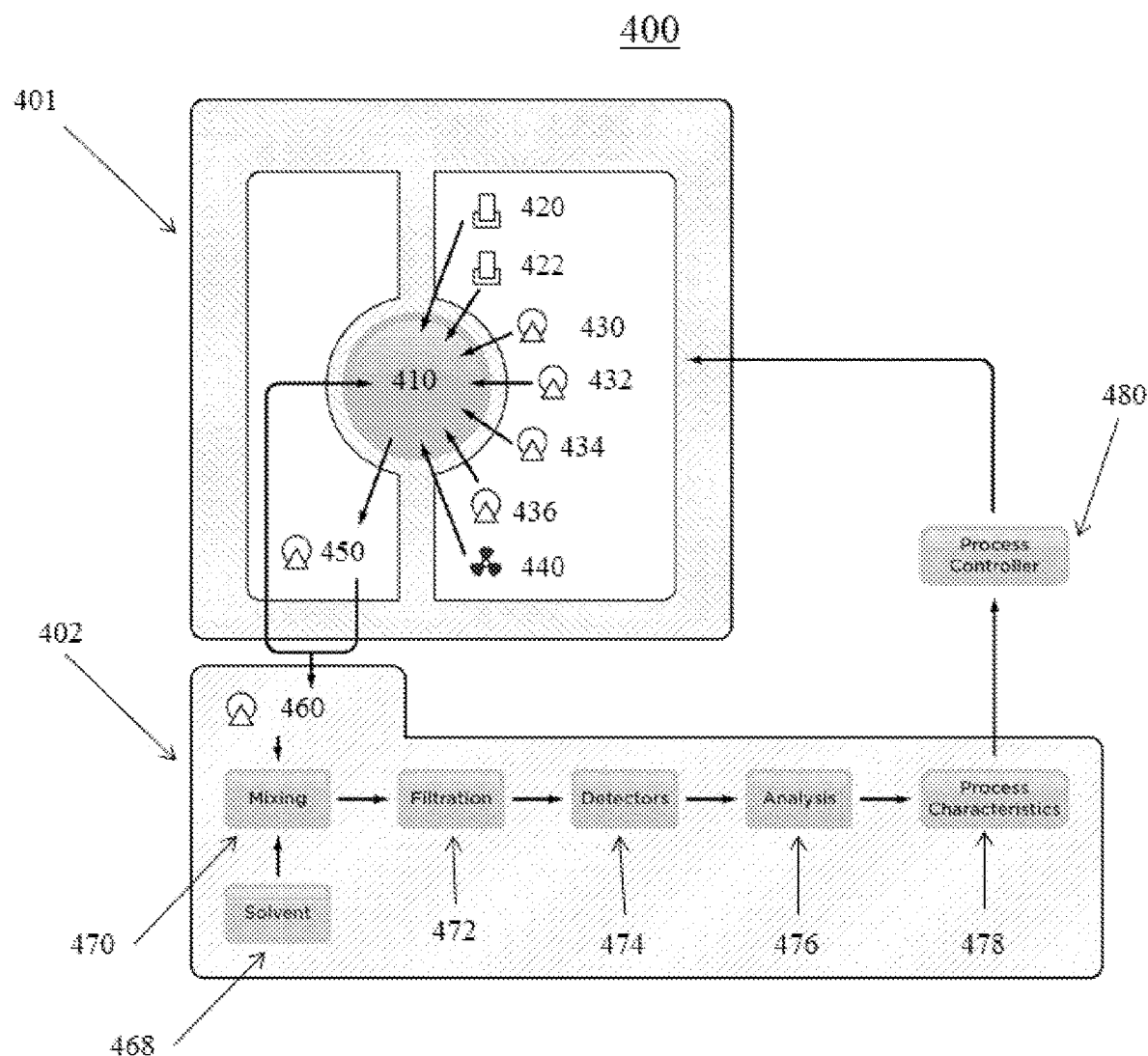
FIG. 4 is a diagram of an exemplary polymerization reaction process control system in association with certain embodiments of the present disclosure.

FIG. 4 is a diagram of an exemplary polymerization reaction process control system 400. The control system 400 includes a ACOMP reactor control interface 401 and an ACOMP analysis control interface 402. In at least one embodiment, the ACOMP reactor control interface 401 and the ACOMP analysis control interface 402 are controlled by a Programmable Logic Controller (PLC) control system (not shown) which is coupled to a computing device (not shown). The PLC control system can be, for example, an Allen Bradley/Rockwell ControlLogix PLC control system (Rockwell Automation, Inc., Milwaukee, Wis., USA). The computing device can be a desktop or laptop computer, a smartphone, a tablet, or any other similar device. The computing device can allow for visualization and control of process control variables and components of the control system 400.

The ACOMP reactor control interface 401 can control various components of the control system 400. One component is a reactor 410. The reactor 410 can be a 1.5 Lm 316-L stainless steel jacketed reactor with a 6 port, bolt-on lid (not shown) that allows for the attachment of process feeds such as monomer, initiator or chain transfer agent, as discussed below. A submersible stainless steel temperature probe (not shown) can be attached through the top of the reactor lid so that temperature of the reactor contents may be accurately monitored and controlled. The reactor lid can allow for the attachment of a mixer 440. The mixer 440 is located outside of the reactor 410. The mixer 440 can be, for example, an IKA Eurostar overhead mixer (IKA® Works, Inc., Wilmingtion, N.C., USA).

An impeller coupling (not shown) can be attached to the mixer 440. The impeller coupling can be, for example, a Buchi Glass Mag Drive impeller coupling (Büchi AG, Uster, Switzerland). The impeller coupling can connect to a 4 blade stainless steel impeller inside of the reactor 410 and provide agitation.

Flow controllers 420, 422 can be used for the addition of gases into the reactor 410. Gases added via the flow controllers 420, 2422 can be, for example, nitrogen, oxygen or air. Flow controllers 420, 422 can be, for example, MKS Gas Flow Controllers (MKS Instruments, Inc, Andover, Mass., USA). Each flow controller 420, 422 can have an inlet (not shown) coupled with a regulated gas cylinder. Each flow controller 420, 422 can be rated for to have an inlet pressure of 100 pounds per square inch (PSI). Each flow controller 420, 422 can have an outlet (not shown) connected the reactor lid. Gas can be precicesly dispensed by a dip tube (not shown) into the reactor 410 through the inlet. Gases can be dispensed to the reactor 410 at a rate ranging from about 20 sccm to about 1000 sccm.

Pumps 430, 432, and 434 can be used for the addition of solutions or liquids to the reactor 410. The sloutions or liquids can be, for example, one or more monomers, one or more initiators, a chain transfer agent, a solvent, fluids for colloidal suspensions or any other suitable solution or liquid for use in a polymerization reaction process. Pumps 430, 432, and 434 can be, for example, reciprocating piston pumps as provided by Fluid Metering Inc. (Syosset, N.Y., USA). Pumps 430, 432, and 434 can allow for precise control of the volumetric flow of solution or liquids being fed into the reactor 410. The volumetric flow can be, for example, rates from about 0.1 ml/min to about 20 ml/min. Pumps 430, 432, and 434 can be reversible such that they can also be used to extract contents, such as reagents or other chemical components or polymerization reaction process products, from the reactor 410.

The reactor 410 and contents contained therein can also be subjected to heating or cooling from a temperature controller 438. The temperature controller 438 can transfer heat to the reactor 410 and contents contained therein vie a jacket (not shown). The jacket can be permanently or reversibly connected to one or more external surfaces of the reactor 410. The jacket of the can be conneted to a temperature controlled circulating bath (not shown). The submersible temperature probe, as mentioned previously, can be used to complete a feedback loop which accurately maintains the desired temperature of the reactor 410 and contents therein. The inlet and outlet temperature of the reactor jacket can each be monitored by a thermocouple (not shown) for use in calorimetric heat transfer calculations.

The reactor 410 is also coupled with a recycle pump 450. The recycle pump can be coupled with a bottom portion of the reactor 410 via a drain port (not shown), and ball valve (not shown). Reactor contents can be continuously extracted through the recycle pump 450 and recycled back into the top of the reactor. The reactor contents can be pumped through a recycle line comprising, for example, ⅛" OD stainless steel tubing. The reactor contents can be pumped at a rate of 20 ml/min. Alternatively, the reactor contents can be pumped at a rate ranging from, for example 5 ml/min to 50 ml/min, alternatively 10 ml/min to 40 ml/min, and alternatively 15 ml/min to 30 ml/min. An extraction point along the recycle line can be used to sample a small stream of the reactor contents for conditioning and analytical measurement by the ACOMP system interface 402. The recycle pump 450 can be an internal gear pump such as a Zenith Pump (Colfax Corporation, Annapolis Junction, Md., USA). The internal gear pump can have a displacement of, for example, 0.1 cc per revolution. The recycle pump 450 can be made of hardened tool steel and be rated for viscosity ranges of 1-2M centipoise.

An extraction pump 460 connects the ACOMP system interface 402 to the reactor control interface 401 via the recycle pump 450 can be, for example, reciprocating piston pumps as provided by Fluid Metering Inc. (Syosset, N.Y., USA). The volumetric flow of the extraction pump 460 can be, for example, rates from about 0.2 ml/min to about 2 ml/min. Extraction pump 460 can pump in both forward and reverse direction.

The extracted reactor contents are combined with a flow of quenching solvent from, a solvent source 468. The extracted reactor contents and solvent can be combined at a ratio of, for example, 10/1. This purpose of the quenching solvent is to halt propagation of the polymerization reaction process. Mixing and dilution processes of reduce the concentration of extracted reactor contents to allow for measurement of single molecule intrinsic properties. Once the reactor contents are combined with the quenching solvent. The combination can be passed by inert propylene tubing to a dynamic mixing chamber 470. This mixing chamber 470 can be used to actively stir and combine the two continuous streams of reactor contents and solvent into one homogenous mixture. The volumetric amount and agitation/stirring rate of the mixing chamber 470 should pre-determined and customized according to the polymerization reaction process or corresponding characteristics. Occasionally in cases of extremely high reactor concentrations, there can be a need for additional mixing for further dilution. In such instances, an additional mixing chamber (not shown) and secondary solvent, from a secondary solvent source (not shown) can be used to further reduce the concentration of the reactor contents for single molecule measurement.

After the homogenous solution leaves the mixing chamber, it is passed through a filtration system 472 to remove any particulate or gel matter that may have been removed from the reactor 410 with the reactor contents. In one non-limiting example, filtration system 472 is a 40 µm stainless steel mesh filter. The type of filtration system 472 is not limiting in any way and can be changed depending of the particular polymerization reaction process or characteristics thereof.

The filtered homogeneous solution can then be flowed through one or more inline analytical detectors 474. One or more inline analytical detectors can be called a "detector train." In one example, the detector train can include a UV/Visible absorption spectrometer and a temperature controlled single capillary viscometer. The UV/Visible absorption spectrometer can continuously monitor up to four (4) independent wavelengths and have a 0.2 cm path length cell capable of accommodating flow rates up to 50 ml/min, such as for example a UV/Visible absorption spectrometer from Gilson, Inc. (Middleton, Wis., USA). The UV absorption of the homogeneous solution can be directly correlated, for example, to the concentration of monomer in the reactor contents and to the concentration of polymer produced as monomer is consumed throughout the polymerization. The single capillary viscometer is designed for monitoring the differential change of pressure across the capillary due to the increase or decrease of viscosity of a steady flow of solution. This measure of viscometric pressure along with the concentration determined from the UV/Vis detector allows for the absolute measure of intrinsic/reduced viscosity of the polymer being produced. This single capillary viscometer was developed and produced by Advanced Polymer Monitoring Technologies Inc.

The analysis procedures handled by the ACOMP analysis control interface 402 include the interpretation of raw UV/Vis absorption and viscometric pressure to determine the process characteristics of; Monomer Concentration, Polymer Concentration, Total Process Conversion, Intrinsic/Reduced Viscosity. The automated method of this interpretation is handled by an on board analysis package 476 that responds to manual operation triggers through interface with Automation and Control software. These triggers instruct the analysis software to perform key analysis algorithms appropriate to each step or phase in the polymerization reaction process.

A process controller 480 can be coupled with the ACOMP reactor control interface 401 and the ACOMP analysis control interface 402 to provide a means to which the user can interact with the ACOMP reactor control interface 401 to perform operations that will directly influence the propagation of the polymerization reaction and view data obtained from the ACOMP analysis control interface 402.

Figure 5:
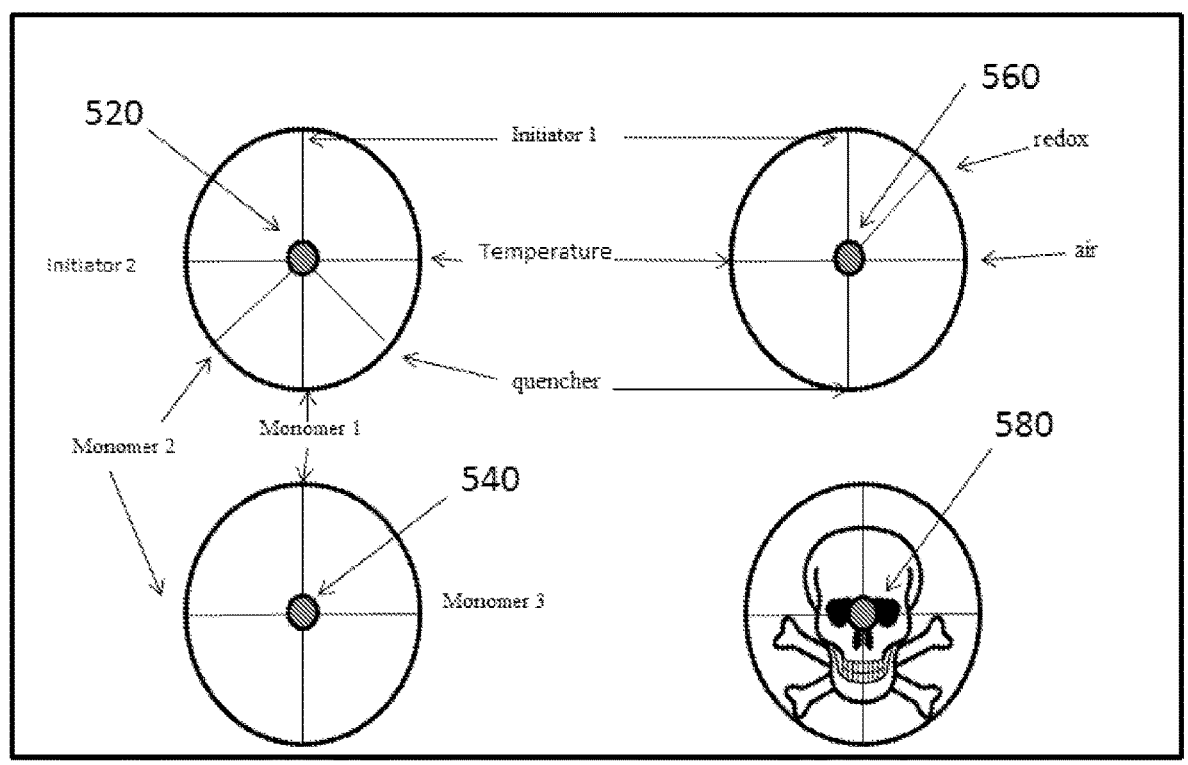
FIG. 5 is a diagram of an exemplary interface for active manual control of process control variables of a polymerization reaction process in association with certain embodiments of the present disclosure.

FIG. 5 is a diagram of an exemplary interface for active manual control of process control variables of a polymerization reaction process. The exemplary interface 500 can be a part of the process controller 480 or can be a component separate from the process controller 480. The exemplary interface 500 is a control panel which allows an operator to control $M_w$ using an actuatable control member 520, copolymer composition using an actuatable control member 540, and kinetics of a reaction using an actuatable control member 560. The control members 520, 540, 560 can be used control temperature and the flow of initiators, monomers, and quencher. The control members 520, 540, 560 can be joy sticks, dials, buttons, or any other means which allows a user to control temperature and the flow of initiators, monomers, and quencher by actuation in the directions indicated in FIG. 5. These process variables can be manipulated to accelerate the reaction (for example, addition of initiator or raise of temperature), decelerate the reaction (for example, addition of air or quenching agent, lowering of temperature, addition of solvent), and to increase molecular weight (for example, addition of monomer or lowering of temperature) or decrease molecular weight (e.g. add initiator, chain transfer agent, increase temperature). The exemplary interface can either be a physical console, such as the type often used in computer games, or can be 'soft knobs' or 'soft sliders' on a computer screen, such as via a Graphical User Interface (GUI). The embodiment shown also has a button 580 to kill a reaction (e.g. with air or a quencher) as is sometimes necessary during polymer manufacturing (for example, when thermal runaway could cause a dangerous overheating of the reactor, or when it is clear that a polymerization is proceeding below specifications). The presently described subject matter will reduce the number of off-specification polymerization reactions using active control, and, when a reaction is not recoverable by active control, it can be terminated by the kill button 580.

EXAMPLES

An ACOMP system was designed and built, substantially as described in FIG. 4 above, by Advanced Polymer Monitoring Technologies, Inc. (New Orleans, La. ).

The reaction used was the free radical polymerization of acrylamide (Am), using potassium persulfate (KPS) as the initiator. The Am was dissolved at 3% by mass in pure water and KPS used to initiate the reaction.

Experiment 1—Batch Reactor Control

In this experiment a batch experiment was carried out in which the temperature of the reaction started at 52° C., and was then increased to 60° C. then 70° C. during the reaction. The decrease in the ultraviolet absorption signal at 248 nm is shown in microabsorbance units (μA), UV(t). This is directly related to the monomer concentration $C_m(t)$ by $$C_m(t) = \frac{UV(t)}{1.54e6} 3 \times 10^{-3} (g/cm^3) \quad (29)$$

In a batch reaction at low concentration $C_m(t)$ is related to polymer concentration $C_p(t)$ via mass balance $$C_m(0) = C_m(t) + C_p(t) \quad (30)$$

Fractional monomer conversion f(t) is given directly from $C_m(t)$ by $$f(t) = 1 - \frac{C_m(t)}{C_m(0)} \quad (31)$$

To demonstrate the concept of the invention applied to this batch reaction, this reaction was taken as the 'model reaction', whose conversion trajectory is to be followed in subsequent reactions. While this trajectory is not an optimized path, it nonetheless represents a concrete path to be followed, which allows the concepts of the invention to be tested. When an effieicnt or optimized path is found by either offline computation or modeling, or by experimental determination through monitoring real reactions, such a path will simply be substituted for the arbitrary 'model reaction' here.

Figure 6:
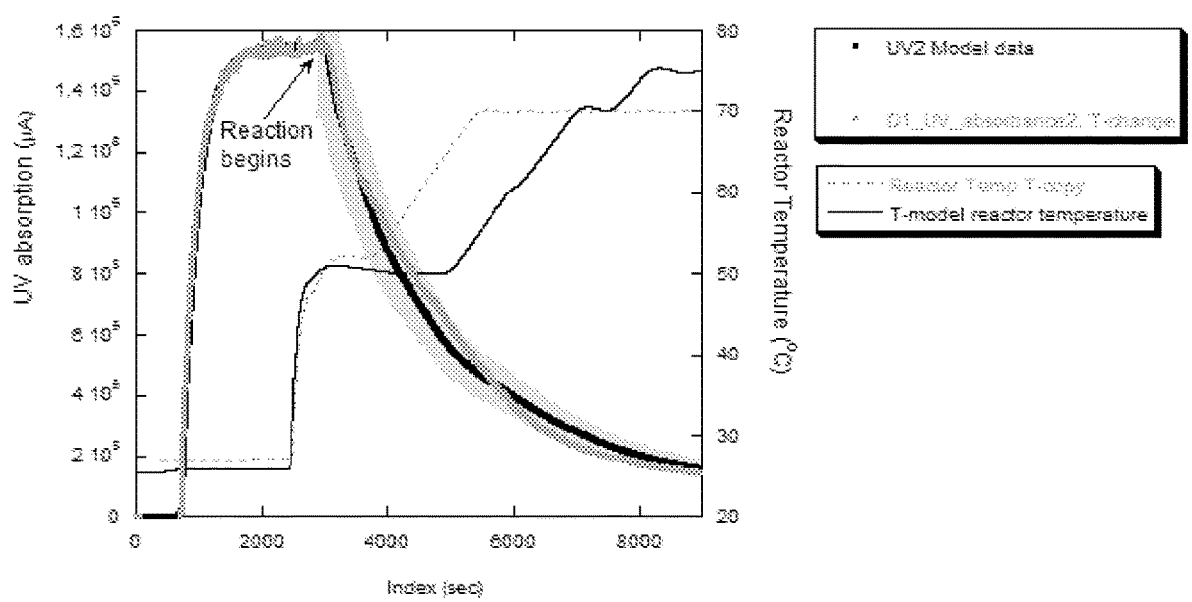
FIG. 6 is a diagram showing a model trajectory, a controlled trajectory, and a swath indicating acceptable trajectory pathway deviation for a batch reactor control process in association with certain embodiments of the present disclosure.

In FIG. 6, the model reaction trajectory is shown as the dark black line. Also in FIG. 6 are data obtained from a subsequent reaction where the temperature was actively controlled manually to steer as close to the dark black line as possible. The dark gray line shows the path of the actively controlled experiment. The light grey shaded swath represents the 15% error bar area, or acceptable trajectory pathway deviation, of the model reaction. As can be seen, the actively controlled reaction lies within the 15% error bar, thus demonstrating the concept of using ACOMP monitoring, together with adjustable reactor parameter controls, to actively control a polymerization reaction process.

Experiment 2—Semi-Batch Reactor Control; Initiator Feed Into The Reactor

In the first of these experiments the goal was to follow the above temperature driven 'model reaction' by controlling the conversion of the reaction via active manual flow of initiator into the reactor, at constant temperature. It is believed that this is the first time such near realtime control of a free radical polymerization has been achieved. It is the isomorphic mapping of an initiator-concentration controlled chemically initiated isothermal reaction onto a thermally controlled chemically initiated reaction. This represents a pair of 'isomorphic reactions' and they could be termed 'thermal/initiator-concentration conversion isomorphs' of each other.

Figure 7:
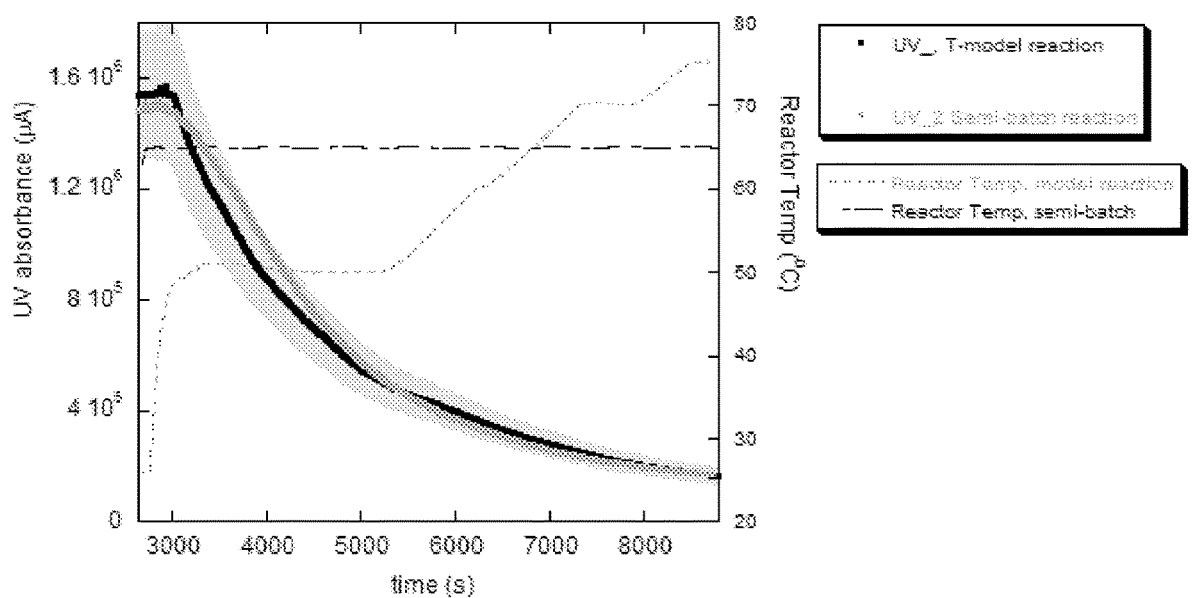
FIG. 7 is a diagram showing a model trajectory, a controlled trajectory, and a swath indicating acceptable trajectory pathway deviation for an active manual controlled semi-batch reactor control process in association with certain embodiments of the present disclosure.

FIG. 7 is a diagram showing the same model reaction data from the batch reaction example as the dark black line. The dark grey line is a subsequent semi-batch experiment in which the initiator feed into the reactor was actively manually controlled to steer the reaction as close to the model trajectory as possible. The light grey shaded swath represents the 15% error bar area, or acceptable trajectory pathway deviation, of the model reaction. As seen, the actively controlled semi-batch reaction with initiator feed at constant temperature lies within the 15% error bar, thus demonstrating the concept of using ACOMP monitoring, together with adjustable reactor parameter controls, to actively control a semi-batch polymerization reaction process. Also shown in the figure is the steady reactor temperature of the semi-batch reaction, contrasted with the changing temperature profile from the model reaction.

Figure 8:
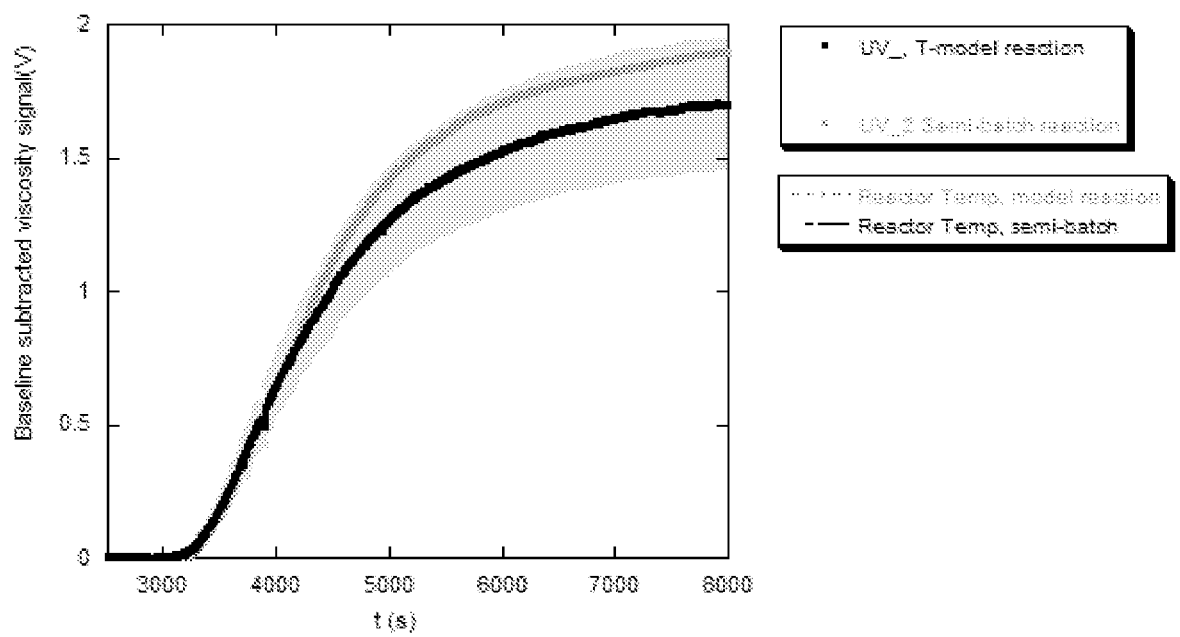
FIG. 8 is a diagram of the corresponding dilute solution viscosity signal for the above active manual controlled semi-batch reactor control process in association with certain embodiments of the present disclosure.

FIG. 8 is a diagram showing the corresponding dilute solution viscosity signal for the above active manual controlled reaction. The black line is the model trajectory, the dark grey line is the result of the active manual control reaction, and the light grey swath is the 14% error bar interval, or acceptable trajectory pathway deviation, of the model trajectory.

Experiment 3—Semi-Batch Reactor Control; Monomer Flow into the Reactor; Using Dilute Solution Viscosity To Actively Control Polymerization In experiment 3, monomer was flowed into the reactor using dilute solution viscosity, a polymer based characteristic, to actively control polymerization. The goal was to first establish a dilute solution viscosity trajectory based on monomer flow into the reactor, without changing initiator, and only changing temperature at the end of the reaction to polymerize off remaining monomer. Then, a second reaction was run in an attempt to repeat the dilute solution viscosity trajectory of the first reaction. The dilute solution viscosity trajectory is directly related to the molar mass of the polymer and hence this type of active control is based on a fundamental polymer property, as opposed to concentrations of reagents and chemical conversion of monomers into polymer.

Figure 9:
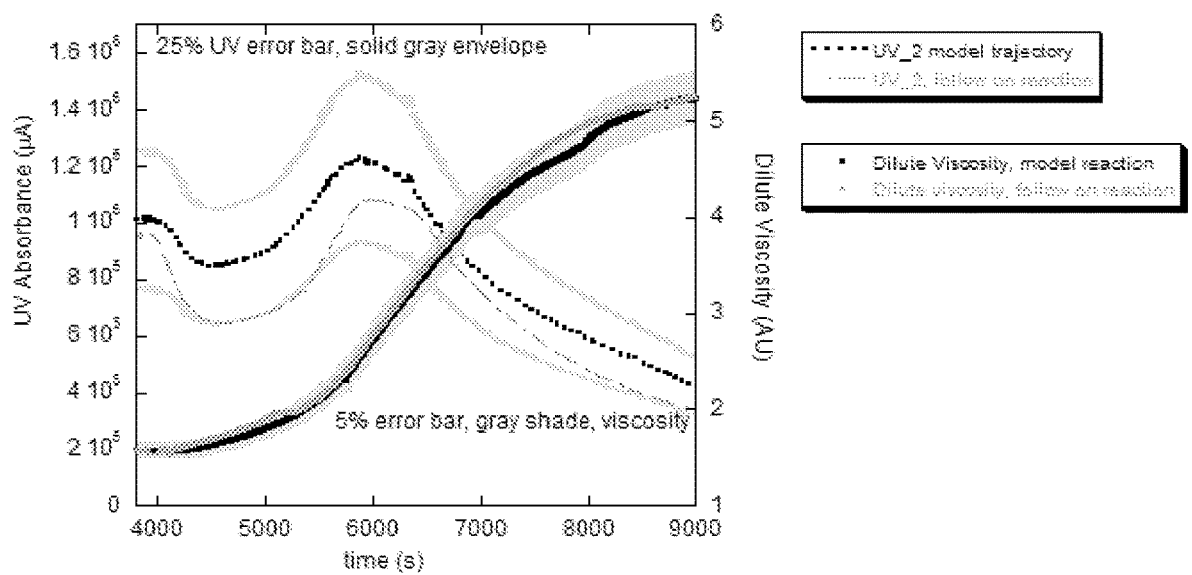
FIG. 9 is a diagram of results of an initial model reaction and a second reaction corresponding to dilute solution viscosity trajectories in association with certain embodiments of the present disclosure.

FIG. 9 is a graph showing the results of the initial model reaction and the second reaction. The solid black curve is the dilute solution viscosity trajectory from the first (model) reaction and the solid dark gray curve is for the second reaction which attempted to repeat the first by controlling monomer feed to the reactor. As shown, the two reactions overlapped very closely and superposed on each other during some trajectory segments. The gray shading represents a 5% error swath. As shown, the second reaction remained within 5% of the first (model) reaction. Hence, the manual active control was successful. The dotted black curve is the UV absorption in the model reaction, proportional to the amount of monomer in the reactor, and the dashed dark gray curve corresponds to the UV absorption for the second reaction. As shown, there was a significant difference between the two reactions in terms of the UV absorption, and a 25% error bar was needed to encompass the second reaction UV within that of the first reaction UV, as seen by the solid gray lines forming a 25% error limit around the dotted black first reaction UV. Hence, in this case, actively controlling the polymer reaction dilute solution viscosity led to a much greater variation in the conversion trajectory.

Figure 10:
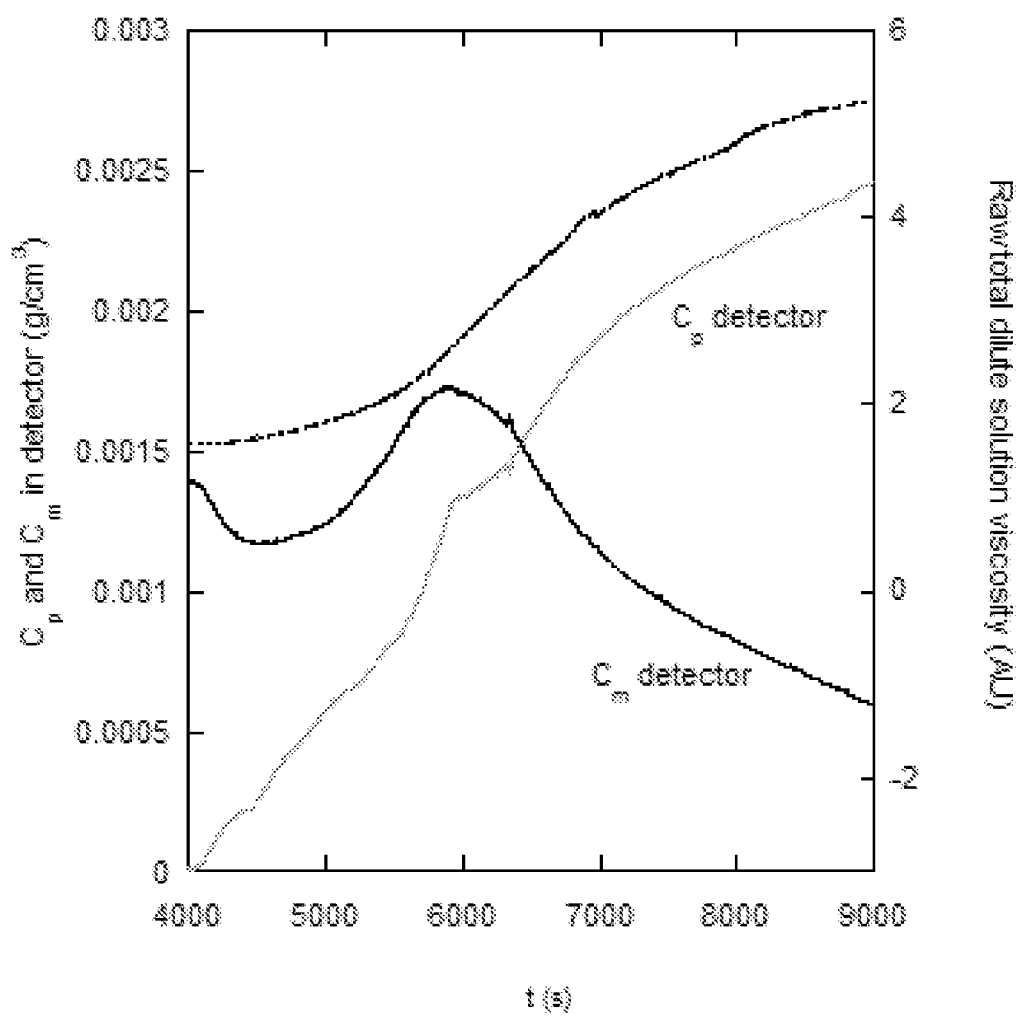
FIG. 10 is a diagram illustrating the control of monomer flow for the two reactions of FIG. 9 in association with certain embodiments of the present disclosure.

FIG. 10 is a diagram showing the control of monomer flow for the two reactions of FIG. 9. These were read and recorded by the part of the ACOMP system that controlled monomer flow rates into the reactor. The dark black points are for the first (model) reaction and the gray points from the follow on reaction. As can be seen, the follow on flow rate timing is not identical to the one for the first reaction. It is the small but deliberate, actively controlled differences in flow rate in the second reaction that allowed the dilute viscosity to so closely follow the first (see FIG. 9).

The strong upward curvature (positive second derivative) seen in both viscosity curves, with the subsequent inflection point at about 6,300s is the result of the monomer feed increasing the instantaneous kinetic chain length of the polymers, which in turn increases their intrinsic viscosity. The dilute solution viscosity, $\eta$, measured in figure E is given by $$\eta = \eta_s(1 + [\eta]C_p + \kappa_H[\eta]^2 C_p^2 + \ldots) \quad (35)$$

where $\eta_s$ is the viscosity of the pure solvent, water in this case ($\eta_s = 0.0089$ Poise for water at 25° C. at standard pressure), $C_p$ is polymer concentration (in g/cm$^3$), $[\eta]$ is intrinsic viscosity, and $\kappa_H$ is a dimensionless constant equal to approximately 0.4 for linear polymers, such as the polyacrylamide produced in the reactions here. Because the solution is very dilute the $C_p^2$ term is small and the major contribution to $\eta$ is from the term $[\eta]C_p$. $[\eta]$ is a fundamental physical property of a given polymer at a given solvent and temperature, and measures the hydrodynamic volume $V_H$ per unit of molar mass of an individual polymer (i.e. intrinsic viscosity removes all dependence on polymer concentration and so is much different than bulk viscosities in reactors which are normally concentrated in polymer and so the bulk viscosities depend strongly on polymer concentration).

$$[\eta] = \frac{V_H}{M} \quad (36)$$

$V_H$, in turn, depends on the polymer conformational type. For a random coil linear polymer, such as polyacrylamide, $[\eta]$ obeys normally obeys a power law of the form $$[\eta] = aM^\alpha \quad (37)$$

where $\alpha$ is often termed the Mark-Houwink coefficient and for coil polymers, such as polyacrylamide, ranges from 0.5 to 0.8, depending on the type of solution and temperature.

The fact that instantaneous chain length depends on monomer concentration is seen in the relationship between chain length monomer concentration [m], free radical concentration [R], and the propagation and termination constants, $k_p$ and $k_t$, the relationship is shown as follows:

$$\text{instantaneous chain length} = \frac{k_p[m]}{k_t[R]} \quad (38)$$

The increase in [m] due to the flow of monomer into the reactor, while [R], which is proportional to the square root of the very slowly composing potassium persulfate initiator, remains essentially constant, so that the chain lengths increase during the reaction. Therefore, increasing chain length due to monomer flow leads to increasing $[\eta]$ which leads to increasing dilute solution viscosity. Thus, the assertion that following dilute solution viscosity is based on following a molar mass based polymer characteristic is demonstrated.

The countervailing case is seen in FIG. 7, where the curve is concave downwards (negative second derivative), since the chains are increasingly shorter as the reaction proceeds due to the fact that the monomer concentration is dropping throughout the reaction (there is no monomer feed into the reactor) and [R] is increasing because temperature is increasing, which leads to faster initiator decomposition and increased [R].

Having shown that dilute solution viscosity is a measure of polymer molar mass the following figure shows the extraction of the reduced viscosity $\eta_r$ from combining the raw total dilute solution viscosity with the concentration of polymer $C_p$. $\eta_r$ is defined as $$\eta_r = \frac{\eta - \eta_s}{\eta_s C_p} \quad (39)$$

The intrinsic viscosity $[\eta]$ is $\eta_r$ extrapolated to zero concentration. The current data are at low enough concentration to be effectively close to the zero concentration limit, so that $[\eta] \approx \eta_r$. Of course, $M_w$ can be measured directly by evaluating the absolute total intensity scattered by a polymer solution, and this has been done regularly with the ACOMP platform since 1998 by Reed et al.

The following figure shows polymer and monomer concentration in the detector train, together with raw viscosity for a semi-batch feed experiment where the reservoir of monomer (Acrylamide) was at 0.500 g/cm$^3$ and pumped into the reactor, initially containing 0.014 g/cm$^3$ of monomer. The reaction began at about 4,000s. $C_m$ first falls as monomer is consumed in polymerization, but the flow of monomer into the reactor starting around 4,000s causes $C_m$ to rise up to about 6,000s, at which point the monomer flow was turned off and $C_m$ begins to fall monotonically while $C_p$ continues to rise.

Figure 11:
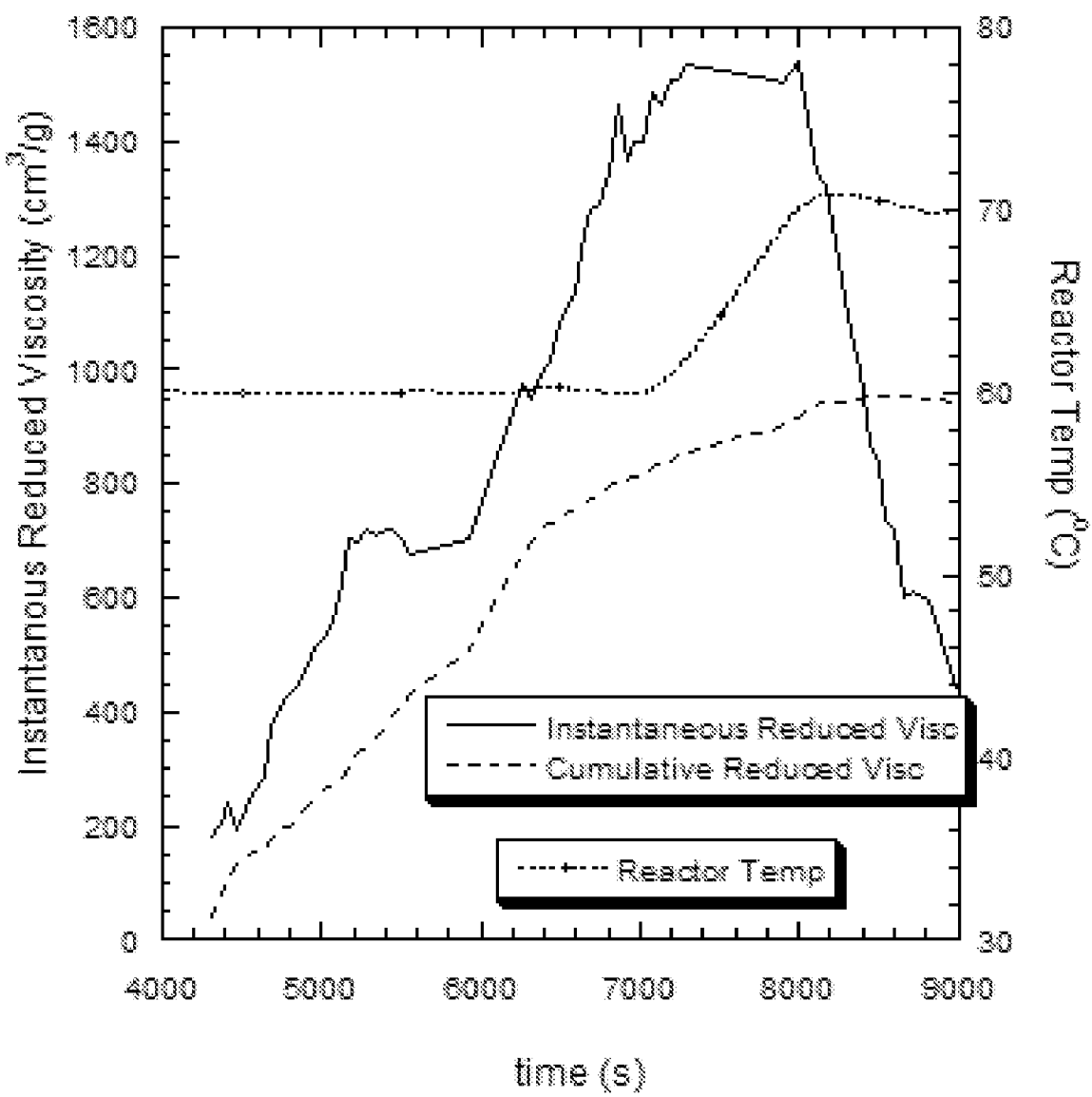
FIG. 11 is a diagram illustrating the combination of $C_p$ and raw viscosity from FIG. 10 to yield the reduced viscosity in association with certain embodiments of the present disclosure.

FIG. 11 is a diagram showing the combination of $C_p$ and raw viscosity from the previous figure to yield the reduced viscosity $\eta_r$, shown by the dashed line. The instantaneous reduced viscosity $\eta_{r,inst}$ was computed from equation 27b. It rises during the addition of monomer, as expected, climbs for a period thereafter and then begins to drop precipitously when the reactor temperature was raised to 60° C. towards the end of the reaction to consume the remaining monomer. Hence, the monomer feed caused larger chains to be produced as the feed continued, whose size subsequently tapered off.

Figure 12:
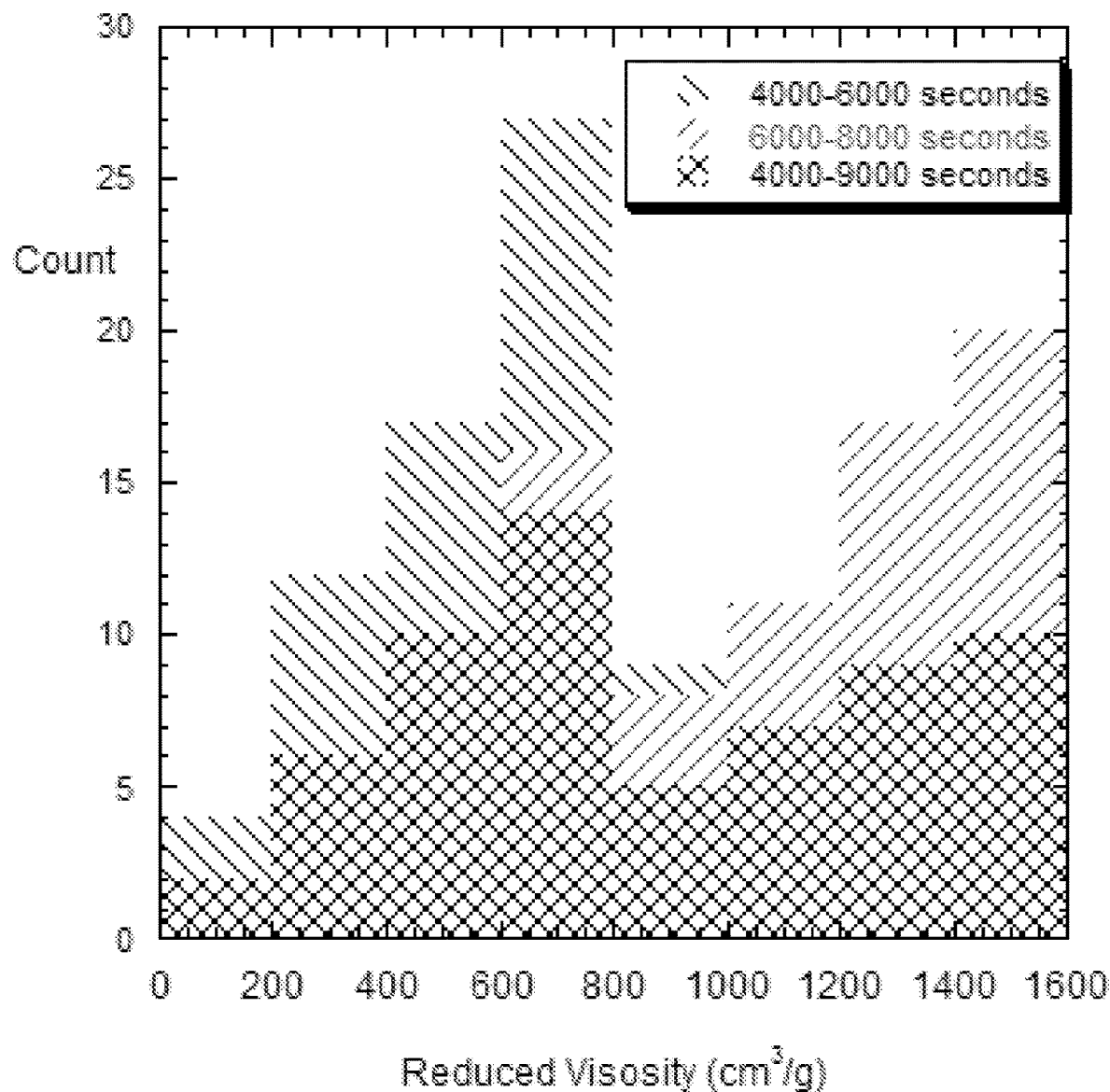
FIG. 12 is a diagram showing how histograms of $\eta_{r,inst}$ over different intervals of a reaction can be used to produce reduced viscosity distributions in association with certain embodiments of the present disclosure.

FIG. 12 is a diagram showing how histograms of $\eta_{r,inst}$ over different intervals of the reaction can be used to produce reduced viscosity distributions which, in the limit of low polymer concentration, are approximately equal to the intrinsic viscosity distributions. Corrections using $\kappa_H$ in equation 35 can be used to refine the agreement between the two distributions if $C_p$ in the detector train is not low enough). The rightward falling diagonal hash histogram shows how low but increasing $\eta_{r,inst}$ chains are produced from 4,000-6,000s, and large chains are produced from 6,000-8,000s. The entire distribution from 4,000-9,000s shows the breadth of low and high $\eta_{r,inst}$ chains that have accumulated during the reaction.

Realtime representations of these distributions, such as in FIG. 12, can help to pilot reactions by directing them towards desired end distributions, using process control variables such as amount of monomer, amount of initiator, and chain transfer feed, and reactor temperature.

Experiment 4—Continuous Reactor Control

Figure 13:
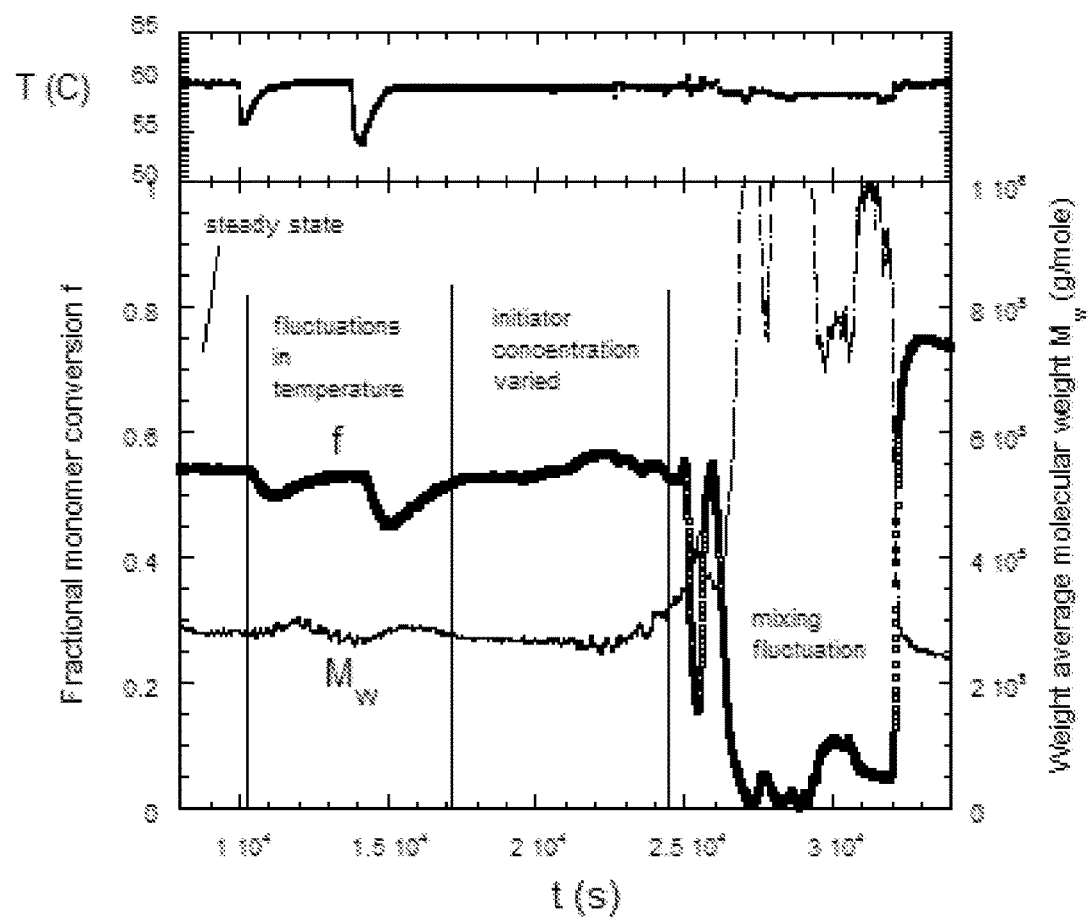
FIG. 13 is a diagram of fractional monomer conversion (f, left hand y-axis) and weight average molecular weight ($M_w$, right hand y-axis) for a continuous lab-scale reactor producing polyacrylamide by a free radical reaction in water in association with certain embodiments of the present disclosure.

The invention could be applied to a continuous reactor. To illustrate this, consider the experiments of Grassl and Reed in "Online polymerization monitoring in a continuous tank reactor", *Macromolecular Chemistry and Physics*, Vol. 203, pp. 586-597, 2002, the contents of which are incorporated by reference herein. FIG. 13 is a diagram showing fractional monomer conversion f (left hand y-axis) and weight average molecular weight $M_w$ (right hand y-axis) for a continuous lab-scale reactor producing polyacrylamide by a free radical reaction in water. For the 10,000 (indicated graphically as 1 $10^4$) seconds, both f and $M_w$ are at steady state, meaning each of these process characteristics are constant and measured to be horizontal lines vs. time. Between 10,000 and 17,000 seconds, temperature fluctuations were introduced into the reactor. The temperature fluctuations can be seen as temperature dips in the top-most bar. The effect of the temperature changes is immediately seen in f and Mw. As described above, the initiator decay rate, which produces free radicals, is exponentially sensitive to temperature $k_d = ae^{-bT}$. Therefore, the reaction rate decreases, so that f decreases, and the kinetic chain length, which is the ratio of monomer to free radical, must increase. The respective decrease in f and increase in $M_w$ can be seen in FIG. 13. Between 17,000 and 24,500 seconds, the initiator concentration is varied by increasing the amount of initiator. Due to a resulting increase in free radical concentration, f is increases and $M_w$ decreases.

Had the presently disclosed subject matter been available at that time, these deviations from the original steady state could have been avoided by actively controlling temperature, initiator feed, and monomer concentration. This could have been achieved either manually, by driving the reaction back towards steady state using these control variables, or, using the disclosed equations above, the incremental variations in f and $M_w$ could be related to incremental changes in process variables needed to drive the polymerization reaction process toward the steady state, which can be considered the ideal or desired reaction trajectory, and these computed values could be used to carry out the changes in process variables either manually or automatically.

Statements of the Disclosure Include

Statement 1: A device comprising: a reactor for containing one or more contents of a polymerization reaction process; a means of automatically and continuously extracting an amount of the one or more contents from the reactor; a means of diluting and/or conditioning the one or more extracted chemical components in a stream; a means of measuring and computing one or more process characteristics of the one or more extracted contents, either continuously or at discrete intervals, of the stream; and a process controller to direct a change in one or more process control variables to alter a trajectory of the polymerization reaction process to achieve a target characteristic.

Statement 2: The device according to Statement 1, wherein one or more of the reactor, the means of extracting, the means of diluting and/or conditioning, and the means of measuring and computing are incorporated in an automatic continuous online monitoring of polymerization (ACOMP) system.

Statement 3: The device according to any one of Statements 1-2, wherein the process controller uses governing kinetic and associated equations to compute the effect on process properties due to changes in process variables.

Statement 4: The device according to any one of Statements 1-3, wherein the process controller comprises an interface for active manual control of the one or more process control variables, the interface comprising one or more actuatable control members, each actuatable control member configured to control one or more process control variables.

Statement 5: The device according to any one of Statements 1-4, wherein a polymerization reaction or a series of polymerization reactions can be actively controlled.

Statement 6: The device according to any one of Statements 1-5, wherein one or more pre-determined reaction trajectories for one or more polymerization reaction process characteristics is followed in response to the change in one or more process control variables.

Statement 7: The device according to Statement 6, wherein the one or more pre-determined reaction trajectories are determined using a historical trajectory from a historical database.

Statement 8: The device according to Statement 6, wherein the one or more pre-determined reaction trajectories are determined using a computed trajectory.

Statement 9: The device according to any one of Statements 1-8, wherein the one or more process variables comprise controlled addition of reagents or chemical components to the reactor either continuously or discretely, a change in temperature, a change in pressure, or any combination thereof.

Statement 10: The device according to any one of Statements 1-9, wherein the polymerization reaction process target characteristics comprise a pre-determined reaction process trajectory, polymer molecular weight, intrinsic viscosity, molecular weight distribution, intrinsic viscosity distribution, reduced viscosity distribution, composition distribution, kinetics, conversion of monomers, conversion of co-monomers, co-monomer composition, co-monomer drift, the presence of particulates, or any combination thereof.

Statement 11: The device according to any one of Statements 1-10, wherein the change in one or more process control variables occurs under a model-independent manual active approach.

Statement 12: The device according to any one of Statements 1-10, wherein the change in one or more process control variables occurs under a model-dependent manual active approach.

Statement 13: The device according to any one of Statements 1-10, wherein the change in one or more process control variables occurs under a model-independent automatic approach.

Statement 14: The device according to any one of Statements 1-10, wherein the change in one or more process control variables occurs under a model-dependent automatic approach.

Statement 15: The device according to any one of Statements 1-14, wherein the one or more extracted contents can be sent to a waste reservoir or can be recirculated into the reactor.

Statement 16: The device according to any one of Statements 1-15, wherein the process characteristic is directly related to the molar mass of polymers being produced.

Statement 17: The device according to Statement 16, wherein the process characteristic molar mass is any one of a cumulative weight average molar mass, a cumulative weight average reduced viscosity, a cumulative weight average intrinsic viscosity, an instantaneous weight average molar mass $M_w$, an instantaneous weight average reduced viscosity, an instantaneous weight average intrinsic viscosity, a molecular weight distribution, a reduced viscosity distribution, and an intrinsic viscosity distribution.

Statement 18: A method, comprising: performing, in a reactor vessel, a polymerization reaction process; continuously extracting, from the reactor vessel, a defined amount per unit of time of contents of a polymerization reaction process; diluting and/or conditioning the extracted contents of the polymerization reaction process; measuring, either continuously or at discrete intervals, one or more properties of the diluted and/or conditioned extracted contents of the polymerization reaction process; and altering, via a manual or automatic controller, one or more process variables in response to the one or more measured properties to alter a trajectory of the polymerization reaction process to achieve a target characteristic.

Statement 19: The method according to Statement 18, wherein one or more of the steps are conducted using an ACOMP system.

Statement 20: The method according to any one of Statements 18-19, wherein one or more pre-determined reaction trajectories for one or more polymerization reaction process characteristics are followed using active control.

Statement 21: The method according to any one of Statements 18-20, wherein computations are made, in the manual or automatic controller, to determine how the measured properties can be changed by altering process variables.

Statement 22: The method according to any one of Statements 18-21, wherein the change in one or more process control variables occurs under a model-independent manual active approach.

Statement 23: The method according to any one of Statements 18-21, wherein the change in one or more process control variables occurs under a model-dependent manual active approach.

Statement 24: The method according to any one of Statements 18-21, wherein the change in one or more process control variables occurs under a model-independent automatic approach.

Statement 25: The method according to any one of Statements 18-21, wherein the change in one or more process control variables occurs under a model dependent automatic approach.

Statement 26: The method according to any one of Statements 18-25, wherein the process characteristic is directly related to a molar mass of polymers being produced.

Statement 27: The method according to Statement 26, wherein the molar mass is any one of a cumulative weight average molar mass, a cumulative weight average reduced viscosity, a cumulative weight average intrinsic viscosity, an instantaneous weight average molar mass $M_w$, an instantaneous weight average reduced viscosity, an instantaneous weight average intrinsic viscosity, an molecular weight distribution, a reduced viscosity distribution, and an intrinsic viscosity distribution.

Statement 28: A method, comprising: performing, in a reactor vessel, a polymerization reaction process; continuously extracting, from the reactor vessel, a defined amount of a polymerization reaction process product; diluting and/or conditioning the extracted polymerization reaction process product; measuring, either continuously or at discrete intervals, one or more properties of the diluted and/or conditioned extracted polymerization reaction process product; and actively altering, via a manual or automatic controller, one or more process control variables in response to the one or more measured properties to alter a trajectory of the polymerization reaction process to achieve a target characteristic, wherein a historical database, derived from the use of manual or automatic active control of polymerization reaction processes, is used to determine how the one or more measured properties can be changed by actively altering the one or more process control variables.

Statement 29: A device comprising: a polymerization reaction vessel configured to contain a content undergoing a reaction that is affected by at least one variable; an extractor configured to continuously sample content from the polymerization reaction vessel; a conditioner configured to condition the continuously sampled content for measurement; a measurement module configured to measure and compute one or more process characteristics of the conditioned continuously sampled content; and a process controller configured to cause a change in the at least one variable to alter a trajectory of the polymerization reaction process to achieve a target characteristic.

Statement 30: The device according to Statement 29, further comprising an analysis module configured to compare the measured values to a reference measurement, and determine a process variable to be altered that is expected to move the measured values of the conditioned sample closer to the reference measurement.

Statement 31: The device according to any one of Statements 29-30, wherein the process controller is configured to cause the change in the at least one variable in response to an output of the analysis module.

Statement 32: A method comprising: obtaining a sample from a reactor within which a polymerization reaction is occurring; conditioning the sample to be in condition for measuring; measuring one or more properties of the conditioned sample; and changing a process variable in response to the one or more measured properties to alter a trajectory of the polymerization reaction process to achieve a target characteristic.

Statement 33: The method according to Statement 32, further comprising: comparing the one or more measured properties to a reference measurement; determining a process variable to alter to move the one or more measured properties of the conditioned sample closer to the reference measurement; and changing a process variable to move the measured properties of the conditioned sample closer to the reference measurement to alter a trajectory of the polymerization reaction process to achieve a target characteristic.

Statement 34: The method according to Statement 33, wherein the determining a process variable to be altered comprises solving a governing kinetic or associated equation.

Statement 35: The method according to Statement 34, wherein the determining a process variable to be altered comprises referencing an historical database to determine how the measured properties can be changed by actively altering process control variables.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

The invention claimed is:

1. A system comprising:
    a reactor for containing one or more contents of a polymerization reaction process;
    an extractor configure for automatically and continuously extracting an amount of the one or more contents from the reactor;
    a dilution apparatus configured for diluting and/or conditioning the one or more extracted contents in a stream;
    a detector for making measurements of the one or more extracted contents in the stream; and
    a process controller configured for determining one or more process characteristics of the one or more extracted contents, either continuously or at discrete intervals, from the measurements of the detector, and for directing a change in one or more process control variables to alter a trajectory of the polymerization reaction process to achieve a target trajectory.

2. The system of claim 1, wherein the reactor, the extractor, the dilution apparatus, the detector, the process controller, or a combination thereof is incorporated in an automatic continuous online monitoring of polymerization (ACOMP) system.

3. The system of claim 1, wherein the process controller uses governing kinetic and associated equations to predict a trajectory of the polymerization reaction process based on a change in the one or more process control variables.

4. The system of claim 1, wherein the process controller comprises an interface for active control of the one or more process control variables; the interface comprising:
    one or more actuatable control members, each actuatable control member configured to control one or more process control variables.

5. The system of claim 1, further comprising a historical database containing a historical trajectory, wherein the process controller uses the historical trajectory from the historical database to determine one or more pre-determined reaction trajectories.

6. The system of claim 1, wherein the one or more process variables comprise controlled addition of reagents or chemical components to the reactor either continuously or discretely, a change in temperature, a change in pressure, or any combination thereof.

7. The system of claim 1, wherein the process controller is configured to determine the target trajectory based on a pre-determined reaction process trajectory, polymer molecular weight, intrinsic viscosity, molecular weight distribution, intrinsic viscosity distribution, reduced viscosity distribution, composition distribution, kinetics, conversion of monomers, conversion of co-monomers, co-monomer composition, co-monomer drift, the presence of particulates, or any combination thereof, and
    wherein the process controller is configured to change the one or more process control variables, based on the determined target trajectory, to cause the trajectory of the polymerization reaction process to achieve the target trajectory.

8. The system of claim 1, wherein the dilution apparatus is selected from high and low pressure mixing chambers, laminar and turbulent mixers, centrifugal and stirred mixers, and mixers at atmospheric pressure.

9. A method, comprising:
    performing, in a reactor vessel, a polymerization reaction process;
    continuously extracting, from the reactor vessel, a defined amount per unit of time of contents of a polymerization reaction process using an extractor;
    diluting and/or conditioning the extracted contents of the polymerization reaction process using a dilution apparatus;
    measuring, either continuously or at discrete intervals, one or more measured properties of the diluted and/or conditioned extracted contents of the polymerization reaction process using a detector;
    determining one or more process characteristics of the one or more extracted contents, either continuously or at discrete intervals, from the one or more measured properties, and
    altering, via a manual or automatic controller, one or more process variables in response to the one or more process characteristics to alter a trajectory of the polymerization reaction process to achieve a target trajectory.

10. The method of claim 9, wherein one or more of the steps are conducted using an ACOMP system.

11. The method of claim 9, wherein one or more pre-determined reaction trajectories for one or more polymerization reaction process characteristics are followed using active control.

12. The method of claim 9, wherein a historical database, derived from the use of manual or automatic active control of polymerization reaction processes, is used to determine how the one or more process characteristics can be changed by actively altering the one or more process control variables.

13. The method of claim 9, further comprising:
    comparing the one or more measured properties to a reference measurement;
    determining a process variable to alter or move the one or more measured properties of the conditioned sample closer to the reference measurement; and
    altering the process variable to move the measured properties of the conditioned sample closer to the reference measurement to alter a trajectory of the polymerization reaction process to achieve the target trajectory.

14. The method of claim 13, wherein the determining a process variable to alter or move comprises solving a governing kinetic or associated equation.

15. The method of claim 13, wherein the determining a process variable to alter or move comprises referencing an historical database to determine how the measured properties can be changed by actively altering process control variables.

16. A device comprising:

a polymerization reaction vessel configured to contain a content undergoing a reaction that is affected by at least one variable;

an extractor configured to continuously sample content from the polymerization reaction vessel;

a conditioner configured to condition the continuously sampled content for measurement;

a measurement module configured to measure and compute one or more process characteristics of the conditioned continuously sampled content; and a process controller configured to cause a change in one or more process control variables to alter a trajectory of the polymerization reaction process to achieve a target trajectory.

17. The device of claim 16, further comprising:

an analysis module configured to compare the measured values to a reference measurement, and determine a process variable to be altered that is expected to move the measured values of the conditioned sample closer to the reference measurement.

18. The device of claim 16, wherein the process controller is configured to cause the change in the at least one process control variable in response to an output of the analysis module.

19. The device of claim 16, wherein the process controller comprises an interface for active control of the one or more process control variables; the interface comprising:

one or more actuatable control members, each actuatable control member configured to control one or more process control variables.

20. The device of claim 16, wherein the one or more process variables comprise controlled addition of reagents or chemical components to the reactor either continuously or discretely, a change in temperature, a change in pressure, or any combination thereof.

21. The device of claim 16, wherein the target trajectory for the polymerization reaction process is based on a predetermined reaction process trajectory involving polymer molecular weight, intrinsic viscosity, molecular weight distribution, intrinsic viscosity distribution, reduced viscosity distribution, composition distribution, kinetics, conversion of monomers, conversion of co-monomers, co-monomer composition, co-monomer drift, the presence of particulates, or any combination thereof.

\* \* \* \* \*